US012212042B2

(12) United States Patent
Jia

(10) Patent No.: US 12,212,042 B2
(45) Date of Patent: Jan. 28, 2025

(54) HOUSING ASSEMBLY, ANTENNA ASSEMBLY, AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 257 days.

(21) Appl. No.: 17/541,234

(22) Filed: Dec. 2, 2021

(65) Prior Publication Data

US 2022/0094039 A1  Mar. 24, 2022

Related U.S. Application Data

(63) Continuation of application No. PCT/CN2020/096621, filed on Jun. 17, 2020.

(30) Foreign Application Priority Data

Jun. 30, 2019 (CN) .......................... 201910588886.9

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 5/335* (2015.01); *H01Q 21/0025* (2013.01); *H04M 1/0266* (2013.01)

(58) Field of Classification Search
CPC .......... H01Q 1/243; H01Q 5/335; H01Q 1/38; H01Q 21/0025; H04M 1/0266
See application file for complete search history.

(56) References Cited

U.S. PATENT DOCUMENTS 6,075,485 A * 6/2000 Lilly .................... H01Q 9/0407
343/895
10,608,321 B2 * 3/2020 Jiang ...................... H01Q 1/528
(Continued)

FOREIGN PATENT DOCUMENTS

CN    101489347    7/2009
CN    102544717    7/2012
(Continued)

OTHER PUBLICATIONS

JPO, Office Action for JP Application No. 2021-576172, Dec. 13, 2022.

(Continued)

*Primary Examiner* — Ricardo I Magallanes
*Assistant Examiner* — Jordan E. DeWitt
(74) *Attorney, Agent, or Firm* — Hodgson Russ LLP

(57) ABSTRACT

A housing assembly, an antenna assembly, and an electronic device are provided in the present disclosure. The housing assembly includes a dielectric substrate and a radio-wave transparent structure. The dielectric substrate has a first equivalent wave impedance to a radio frequency (RF) signal in a preset frequency band. The first equivalent wave impedance differs from a wave impedance of free space by a first difference. The radio-wave transparent structure is carried on and at least partially covers a portion of the dielectric substrate. The housing assembly has a second equivalent wave impedance to the RF signal in the preset frequency band in a region corresponding to the radio-wave transparent structure. The second equivalent wave impedance differs from the wave impedance of the free space by a second difference. The second difference is less than the first difference.

19 Claims, 29 Drawing Sheets

(51) Int. Cl.
*H01Q 5/335* (2015.01)
*H01Q 21/00* (2006.01)
*H04M 1/02* (2006.01)

(56) References Cited

U.S. PATENT DOCUMENTS

| | | | |
|---|---|---|---|
| 11,201,394 B2* | 12/2021 | Jia | H01Q 1/405 |
| 11,205,850 B2* | 12/2021 | Jia | H01Q 9/0414 |
| 11,532,870 B2* | 12/2022 | Jia | H05K 5/0086 |
| 2003/0020655 A1* | 1/2003 | McKinzie, III | H01Q 1/38 |
| | | | 343/909 |
| 2004/0145975 A1* | 7/2004 | Barras | G04G 21/04 |
| | | | 368/281 |
| 2005/0219955 A1* | 10/2005 | Xu | G04R 60/02 |
| | | | 368/88 |
| 2007/0159928 A1* | 7/2007 | Nirasawa | G04G 17/04 |
| | | | 368/47 |
| 2011/0210903 A1* | 9/2011 | Sarabandi | H01Q 15/0086 |
| | | | 343/904 |
| 2012/0044113 A1* | 2/2012 | Satoh | H01Q 9/0407 |
| | | | 343/893 |
| 2012/0122519 A1* | 5/2012 | Jochheim | H04M 1/0202 |
| | | | 455/556.1 |
| 2013/0088408 A1* | 4/2013 | Sim | H01Q 1/243 |
| | | | 427/126.3 |
| 2013/0323579 A1* | 12/2013 | Hwang | H01Q 15/0013 |
| | | | 156/242 |
| 2014/0106684 A1 | 4/2014 | Burns et al. | |
| 2014/0361945 A1* | 12/2014 | Misra | H01Q 1/243 |
| | | | 427/124 |
| 2015/0343884 A1* | 12/2015 | Rousselet | B60J 1/002 |
| | | | 359/360 |
| 2016/0154271 A1* | 6/2016 | Kim | G06F 1/1626 |
| | | | 445/24 |
| 2016/0205229 A1* | 7/2016 | Vincent | H04B 1/385 |
| | | | 455/575.7 |
| 2016/0277843 A1* | 9/2016 | Babayoff | H04R 3/00 |
| 2017/0201014 A1* | 7/2017 | Lee | H01Q 1/44 |
| 2017/0256867 A1* | 9/2017 | Ding | H01Q 15/14 |
| 2017/0324138 A1* | 11/2017 | Talty | H01Q 13/20 |
| 2017/0338548 A1 | 11/2017 | Xiong et al. | |
| 2017/0346179 A1* | 11/2017 | Wu | H01Q 25/001 |
| 2017/0352948 A1* | 12/2017 | Urcia | H01Q 1/286 |
| 2017/0373373 A1* | 12/2017 | Tsuchida | G06K 7/10316 |
| 2018/0062263 A1* | 3/2018 | Ueda | H01Q 1/2283 |
| 2018/0076521 A1* | 3/2018 | Mehdipour | H01Q 5/335 |
| 2018/0102588 A1* | 4/2018 | Szini | H01Q 1/241 |
| 2018/0188838 A1* | 7/2018 | An | H04B 5/72 |
| 2018/0342789 A1 | 11/2018 | Jiang et al. | |
| 2019/0140342 A1* | 5/2019 | Lim | H01Q 1/42 |
| 2019/0207298 A1* | 7/2019 | Liu | H01Q 1/16 |
| 2019/0257933 A1* | 8/2019 | Nath | H01Q 21/064 |
| 2019/0273308 A1* | 9/2019 | Lee | H01Q 19/06 |
| 2020/0021008 A1* | 1/2020 | Yong | H01Q 21/005 |
| 2022/0094039 A1* | 3/2022 | Jia | H01Q 1/38 |
| 2022/0384933 A1* | 12/2022 | Choi | H01Q 5/42 |

FOREIGN PATENT DOCUMENTS

| | | | |
|---|---|---|---|
| CN | 102931454 | 2/2013 | |
| CN | 103094711 | 5/2013 | |
| CN | 103247851 | 8/2013 | |
| CN | 104685578 | 6/2015 | |
| CN | 105379009 | 3/2016 | |
| CN | 105491823 | 4/2016 | |
| CN | 205303676 | 6/2016 | |
| CN | 106505317 | 3/2017 | |
| CN | 108365337 A * | 8/2018 | H01Q 1/22 |
| CN | 207833475 U * | 9/2018 | G06F 3/0412 |
| CN | 208385608 | 1/2019 | |
| CN | 109390701 | 2/2019 | |
| CN | 109669511 A * | 4/2019 | G01S 13/34 |
| CN | 110416739 | 11/2019 | |
| CN | 110635242 | 12/2019 | |
| CN | 110708406 | 1/2020 | |
| CN | 210897636 | 6/2020 | |
| DE | 102018102085 B3 * | 3/2019 | H01L 21/48 |
| WO | 2007005419 | 1/2007 | |

OTHER PUBLICATIONS

"3rd Generation Partnership Project; Technical Specification Group Radio Access Network; NR; User Equipment (UE) radio transmission and reception; Part 2: Range 2 Standalone (Release 17)," 3GPP TS 38.101-2, Sep. 2021, v17.3.0, 185 pages.
"3rd Generation Partnership Project; Technical Specification Group Radio Access Network; Study on new radio access technology: Radio Frequency (RF) and co-existence aspects (Release 14)," 3GPP TR 38.803, Sep. 2017, v14.2.0.
CNIPA, First Office Action for CN Application No. 201910588886. 9, Apr. 6, 2021.
WIPO, International Search Report for PCT/CN2020/096621, Aug. 28, 2020.
Jia et al., "Design of a Metamaterial stealth radome with broadband absorption," Modern Radar, 2017, vol. 39, No. 3, pp. 62-65.
CNIPA, Second Office Action for CN Application No. 201910588886. 9, Oct. 25, 2021.
IPI, Office Action for IN Application No. 202117061388, Jul. 6, 2022.
EPO, Extended European Search Report for EP Application No. 20834501.7, Jul. 4, 2022.
KIPO, Office Action for KR Application No. 10-2021-7043316, Jul. 24, 2023.

* cited by examiner

HOUSING ASSEMBLY, ANTENNA ASSEMBLY, AND ELECTRONIC DEVICE

CROSS-REFERENCE TO RELATED APPLICATION(S)

The present application is a continuation of International Application No. PCT/CN2020/096621, filed on Jun. 17, 2020, which claims priority to Chinese Patent Application No. 201910588886.9, filed on Jun. 30, 2019, the entire disclosure of which are hereby incorporated by reference in entireties.

TECHNICAL FIELD

This disclosure relates to the field of electronic devices, and in particular, to a housing assembly, an antenna assembly, and an electronic device.

BACKGROUND

With the development of mobile communication technology, the traditional fourth generation (4G) mobile communication cannot meet user requirements. The fifth generation (5G) mobile communication is favored by users due to its high communication speed. For example, a data transmission speed in the 5G mobile communication is hundreds of times higher than that in the 4G mobile communication. The 5G mobile communication is mainly implemented via millimeter wave signals. However, in case that a millimeter wave antenna is applied to an electronic device, the millimeter wave antenna is generally disposed within an accommodation space inside the electronic device, due to a relatively low transmittance of the electronic device to the millimeter wave signal to be received by the electronic device, requirements of antenna radiation performance cannot be met. Alternatively, the electronic device has a relatively low transmittance to external millimeter wave signals. As a result, poor communication performances of 5G millimeter waves are often incurred.

SUMMARY

A housing assembly, an antenna assembly, and an electronic device are provided in the present disclosure.

According to a first aspect, a housing assembly is provided. The housing assembly includes a dielectric substrate and a radio-wave transparent structure. The dielectric substrate has a first equivalent wave impedance to a radio frequency (RF) signal in a preset frequency band. The first equivalent wave impedance differs from a wave impedance of free space by a first difference. The radio-wave transparent structure is carried on and at least partially covers a portion of the dielectric substrate. The housing assembly has a second equivalent wave impedance to the RF signal in the preset frequency band in a region corresponding to the radio-wave transparent structure. The second equivalent wave impedance differs from the wave impedance of the free space by a second difference, and the second difference is less than the first difference.

According to a second aspect, an antenna assembly is further provided. The antenna assembly includes an antenna module and the housing assembly provided in the first aspect. The antenna module is configured to emit and receive, within a preset direction range, a radio frequency (RF) signal in the preset frequency band. The radio-wave transparent structure of the housing assembly is at least partially located within the preset direction range.

According to a third aspect, an electronic device is further provided. The electronic device includes the antenna assembly provided in the second aspect. The dielectric substrate includes a battery cover or a screen of the electronic device.

According to a fourth aspect, an electronic device is further provided. The electronic device includes a first antenna module, a dielectric substrate, and a first radio-wave transparent structure. The first antenna module is configured to emit and receive, within a first preset direction range, a first radio frequency (RF) signal in a first frequency band. The dielectric substrate is spaced apart from the first antenna module and at least partially located within the first preset direction range. A part of the dielectric substrate located within the first preset direction range has a first equivalent wave impedance to the first RF signal in the first frequency band. The first equivalent wave impedance differs from a wave impedance of free space by a first difference. The first radio-wave transparent structure is carried on the dielectric substrate and at least partially located within the first preset direction range. The electronic device has a second equivalent wave impedance to the first RF signal in the first frequency band in a region corresponding to the first radio-wave transparent structure. The second equivalent wave impedance differs from the wave impedance of the free space by a second difference. The second difference is less than the first difference.

BRIEF DESCRIPTION OF THE DRAWINGS

To describe technical solutions in the implementations of the present disclosure more clearly, the accompanying drawings required for describing the implementations will be briefly introduced below. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1:
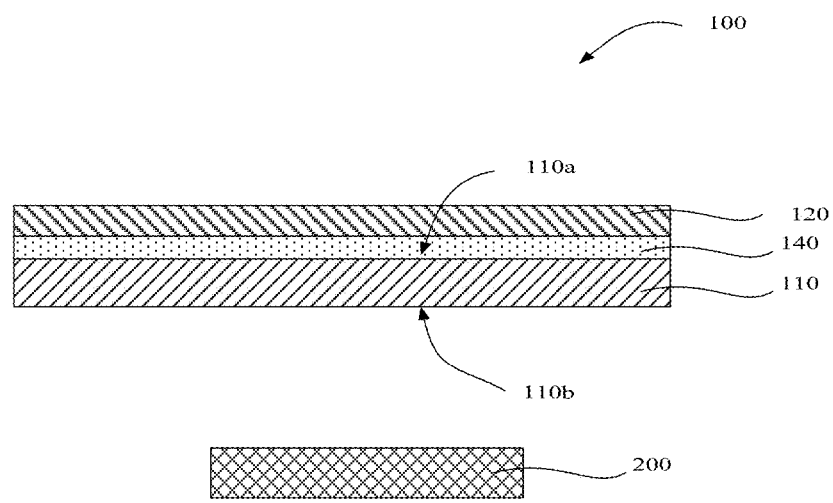
FIG. 1 is a schematic structural view of a housing assembly provided in a first implementation of the present disclosure.

In a first aspect, a housing assembly is provided. The housing assembly includes a dielectric substrate and a radio-wave transparent structure. The dielectric substrate has a first equivalent wave impedance to a radio frequency (RF) signal in a preset frequency band. The first equivalent wave impedance differs from a wave impedance of free space by a first difference. The radio-wave transparent structure is carried on and at least partially covers a portion of the dielectric substrate. The housing assembly has a second equivalent wave impedance to the RF signal in the preset frequency band in a region corresponding to the radio-wave transparent structure. The second equivalent wave impedance differs from the wave impedance of the free space by a second difference, and the second difference is less than the first difference.

In a first implementation of the first aspect, the housing assembly further includes an adhesive layer. The adhesive layer is sandwiched between the radio-wave transparent structure and the dielectric substrate to bond the radio-wave transparent structure to the dielectric substrate.

In a second implementation in combination with the first implementation of the first aspect, the housing assembly further includes a bearing film configured to carry the radio-wave transparent structure. The bearing film is disposed on one side of the radio-wave transparent structure away from the adhesive layer.

In a third implementation in combination with the second implementation of the first aspect, the greater a thickness of the bearing film, the more the preset frequency band shifts towards a low frequency.

In a fourth implementation of the first aspect, the dielectric substrate includes a first surface and a second surface opposite to the first surface. The radio-wave transparent structure is disposed on the first surface or the second surface. Alternatively, the radio-wave transparent structure is embedded in the dielectric substrate.

In a fifth implementation of the first aspect, the radio-wave transparent structure includes multiple conductive lines arranged at intervals along a first direction and multiple conductive lines arranged at intervals along a second direction. The conductive lines arranged at intervals along the first direction and the conductive lines arranged at intervals along the second direction intersect to form multiple mesh-grid structures arranged in an array.

In a sixth implementation of the first aspect, the radio-wave transparent structure includes multiple mesh-grid structures arranged in an array, each of the multiple mesh-grid structures is defined by at least one conductive line, and two adjacent mesh-grid structures share at least part of the conductive line.

In a seventh implementation in combination with the sixth implementation of the first aspect, the mesh-grid structure is in a shape of any of circle, rectangle, triangle, polygon, or ellipse.

In an eighth implementation in combination with any of the fifth to seventh implementation of the first aspect, as a width of the conductive line decreases, the preset frequency band shifts towards a low frequency and a bandwidth of the preset frequency band increases. As a side length or an inner diameter of the mesh-grid structure increases, the preset frequency band shifts towards a low frequency and the bandwidth of the preset frequency band increases. As a thickness of the dielectric substrate increases, the preset frequency band shifts towards a low frequency and the bandwidth of the preset frequency band decreases.

In a second aspect, an antenna assembly is provided. The antenna assembly includes an antenna module and the housing assembly of the first aspect or any of the first to eighth implementations of the first aspect. The antenna module is configured to emit and receive, within a preset direction range, a radio frequency (RF) signal in the preset frequency band. The radio-wave transparent structure of the housing assembly is at least partially located within the preset direction range.

In a third aspect, an electronic device is provided. The electronic device includes the antenna assembly of the second aspect. The dielectric substrate includes a battery cover or a screen of the electronic device.

In a first implementation of the third aspect, the dielectric substrate includes the battery cover of the electronic device, and the battery cover of the electronic device includes a rear plate and a frame bent and extended from a periphery of the rear plate. The radio-wave transparent structure is disposed corresponding to the rear plate or the frame.

In a second implementation of the third aspect, the dielectric substrate includes the screen of the electronic device. The screen includes a screen body and an extending portion bent and extended from a periphery of the screen body. The radio-wave transparent structure is disposed corresponding to the screen body or the extending portion.

In a third implementation of the third aspect, the dielectric substrate includes the screen of the electronic device, the screen includes a display panel and a cover plate stacked with the display panel, and the radio-wave transparent structure is disposed on the cover plate.

In a fourth implementation in combination with the third implementation of the third aspect, the radio-wave transparent structure is disposed on a surface of the cover plate facing the display panel.

In a fifth implementation in combination with the fourth implementation of the third aspect, the display panel includes a color filter substrate, and the color filter substrate is provided with color resist units arranged in a matrix. A black matrix is disposed between adjacent color resist units. The radio-wave transparent structure is at least partially disposed corresponding to the black matrix.

In a fourth aspect, an electronic device is provided. The electronic device includes a first antenna module and a dielectric substrate. The first antenna module is configured to emit and receive, within a first preset direction range, a first radio frequency (RF) signal in a first frequency band. The dielectric substrate is spaced apart from the first antenna module and at least partially located within the first preset direction range. A part of the dielectric substrate located within the first preset direction range has a first equivalent wave impedance to the first RF signal in the first frequency band. The first equivalent wave impedance differs from a wave impedance of free space by a first difference. A first radio-wave transparent structure is carried on the dielectric substrate and at least partially located within the first preset direction range. The electronic device has a second equivalent wave impedance to the first RF signal in the first frequency band in a region corresponding to the first radio-wave transparent structure. The second equivalent wave impedance differing from the wave impedance of the free space by a second difference. The second difference is less than the first difference.

In a first implementation of the fourth aspect, the electronic device further includes a second antenna module and a second radio-wave transparent structure. The second antenna module is spaced apart from the first antenna module and located outside the first preset direction range. The second antenna module is configured to emit and receive, within a second preset direction range, a second RF signal in a second frequency band. The dielectric substrate is spaced apart from the second antenna module and at least partially located within the second preset direction range. A part of the dielectric substrate located within the second preset direction range has a third equivalent wave impedance to the second RF signal in the second frequency band. The third equivalent wave impedance differs from the wave impedance of the free space by a third difference. The second radio-wave transparent structure is carried on the dielectric substrate and at least partially located within the second preset direction range. The electronic device has a fourth equivalent wave impedance to the second RF signal in the second frequency band in a region corresponding to the second radio-wave transparent structure. The fourth equivalent wave impedance differs from the wave impedance of the free space by a fourth difference. The fourth difference is less than the third difference.

In a second implementation in combination with the first implementation of the fourth aspect, the dielectric substrate includes a battery cover of the electronic device. The battery cover of the electronic device includes a rear plate and a frame bent and extended from a periphery of the rear plate. The first antenna module and the second antenna module are both disposed corresponding to the rear plate or the frame. Alternatively, the first antenna module is disposed corresponding to the rear plate and the second antenna module is disposed corresponding to the frame.

In a third implementation in combination with the first implementation of the fourth aspect, the dielectric substrate includes a screen of the electronic device. The screen includes a screen body and an extending portion bent and extended from a periphery of the screen body. The first antenna module and the second antenna module are both disposed corresponding to the screen body or the extending portion. Alternatively, the first antenna module is disposed corresponding to the screen body and the second antenna module is disposed corresponding to the extending portion.

The technical solutions in the implementations of the present disclosure are clearly and completely described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

FIG. 1 is a schematic structural view of a housing assembly 100 provided in a first implementation of the present disclosure. The housing assembly 100 includes a dielectric substrate 110 and a radio-wave transparent structure 120. The dielectric substrate 110 has a first equivalent wave impedance to a radio frequency (RF) signal in a preset frequency band. The first equivalent wave impedance differs from a wave impedance of free space by a first difference. The radio-wave transparent structure 120 is carried on and at least partially covers a portion of the dielectric substrate 110. The housing assembly 100 has a second equivalent wave impedance to the RF signal in the preset frequency band in a region corresponding to the radio-wave transparent structure 120. The second equivalent wave impedance differs from the wave impedance of the free space by a second difference. The second difference is less than the first difference. It is noted that, in the implementations of the disclosure, the radio-wave transparent structure 120 also knowns as a radio-wave transmission structure.

FIG. 1 illustrates an example that the radio-wave transparent structure 120 covers the entire dielectric substrate 110. The RF signal may be, but is not limited to, an RF signal in the millimeter wave band or the terahertz band. Currently, in $5^{th}$ generation (5G) wireless communication systems, in accordance to the protocol of the 3GPP 38.101, frequency bands for 5G NR (new radio) are mainly divided into two different frequency ranges: frequency range 1 (FR1) and frequency range 2 (FR2). The FR1 band has a frequency range of 450 MHz~6 GHz, also known as the "sub-6 GHz" band. The FR2 band has a frequency range of 24.25 GHz~52.6 GHz, and belongs to the millimeter wave (mm Wave) band. 3GPP Release 15 specifies that the current 5G millimeter wave bands include bands n257 (26.5 GHz~29.5 GHz), n258 (24.25 GHz~27.5 GHz), n261 (27.5 GHz~28.35 GHz), and n260 (37 GHz~40 GHz).

The radio-wave transparent structure 120 may have any one of characteristics such as single-frequency single-polarization, single-frequency dual-polarization, dual-frequency dual-polarization, dual-frequency single-polarization, wide-band single-polarization, or wide-band dual-polarization. Accordingly, the radio-wave transparent structure 120 has any one of a dual-frequency resonance response, a single-frequency resonance response, a wide-frequency resonance response, or a multi-frequency resonance response. The radio-wave transparent structure 120 may be made of a metal material or a non-metal conductive material.

On the one hand, the radio-wave transparent structure 120 on the dielectric substrate 110 can be excited by the RF signal in the preset frequency band, and the radio-wave transparent structure 120 can generate an RF signal in the same frequency band as the preset frequency band according to the RF signal in the preset frequency band. The RF signal generated by the radio-wave transparent structure 120 can pass through the dielectric substrate 110 and radiate into free space. Because the radio-wave transparent structure 120 can be excited to generate the RF signal in the same frequency band as the preset frequency band, more RF signals in the preset frequency band can pass through the dielectric substrate 110 to radiate into the free space.

On the other hand, the housing assembly 100 includes the radio-wave transparent structure 120 and the dielectric substrate 110. In this case, a dielectric constant of the housing assembly 100 can be equivalent to a dielectric constant of a preset material. The preset material has a relatively great transmittance to the RF signal in the preset frequency band, and an equivalent wave impedance of the preset material is equal to or approximately equal to a wave impedance in the free space.

In the housing assembly 100 provided in the present disclosure, the radio-wave transparent structure 120 is carried on the dielectric substrate 110. Under the action of the radio-wave transparent structure 120, a difference between the equivalent wave impedance of the housing assembly 100 to the RF signal in the preset frequency band and the wave impedance of the free space is reduced, such that the transmittance of the housing assembly 100 to the RF signal in the preset frequency band is improved. When the housing assembly 100 is applied to an electronic device, the effect of the housing assembly 100 on radiation performance of an antenna module disposed in the housing assembly 100 can be reduced, thereby improving communication performance of the electronic device.

In an example, the dielectric substrate 110 has a first surface 110a and a second surface 110b opposite to the first surface 110a. The radio-wave transparent structure 120 can be disposed on the first surface 110a. In a case where the housing assembly 100 is applied to the electronic device, the electronic device further includes an antenna module 200, and the first surface 110a is further away from the antenna module 200 than the second surface 110b.

Figure 4:
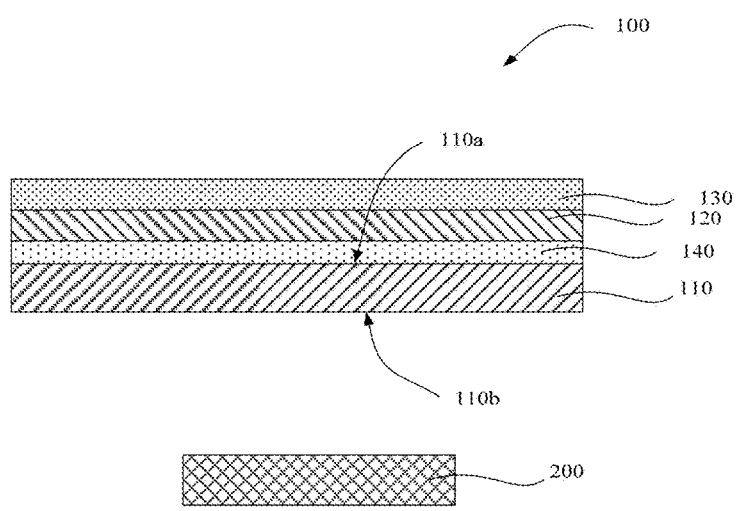
FIG. 4 is a schematic structural view of a housing assembly provided in a fourth implementation of the present disclosure.

In an example, the housing assembly 100 further includes an adhesive layer 140. The adhesive layer 140 can be sandwiched between the radio-wave transparent structure 120 and the dielectric substrate 110, so as to bond the radio-wave transparent structure 120 to the dielectric substrate 110. Referring to FIG. 4, as a non-limiting implementation, the radio-wave transparent structure 120 is bonded to the first surface 110a of the dielectric substrate 110 via the adhesive layer 140 and covers the entire first surface 110a. It is noted that, in other implementations, the radio-wave transparent structure 120 can be directly disposed on the first surface 110a or the second surface 110b of the dielectric substrate 110. Alternatively, the radio wave-transparent structure 120 can be embedded in the dielectric substrate 110.

Figure 2:
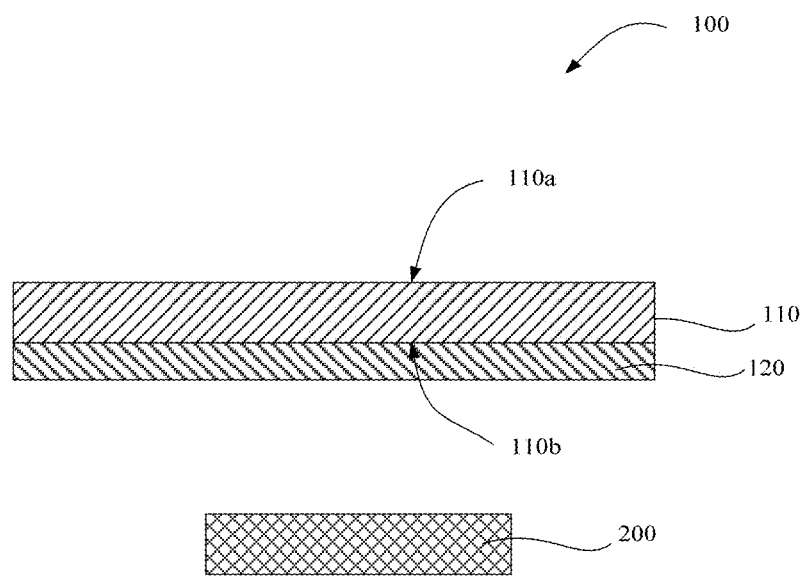
FIG. 2 is a schematic structural view of a housing assembly provided in a second implementation of the present disclosure.

FIG. 2 is a schematic structural view of the housing assembly provided in a second implementation of the present disclosure. The housing assembly 100 includes the dielectric substrate 110 and the radio-wave transparent structure 120. The dielectric substrate 110 has the first equivalent wave impedance to the RF signal in the preset frequency band. The first equivalent wave impedance differs from the wave impedance in the free space by the first difference. The radio-wave transparent structure 120 is carried on the dielectric substrate 110 and at least partially covers a portion of the dielectric substrate 110. The housing assembly 100 has the second equivalent wave impedance to the RF signal in the preset frequency band in a region corresponding to the radio-wave transparent structure 120. The second wave impedance differs from the wave impedance in the free space by a second difference. The second difference is less than the first difference. Further, in this implementation, the radio-wave transparent structure 120 is disposed on the second surface 110b. In a case where the housing assembly 100 is applied to the electronic device, the electronic device further includes the antenna module 200, and the first surface 110a is further away from the antenna module 200 than the second surface 110b.

Figure 3:
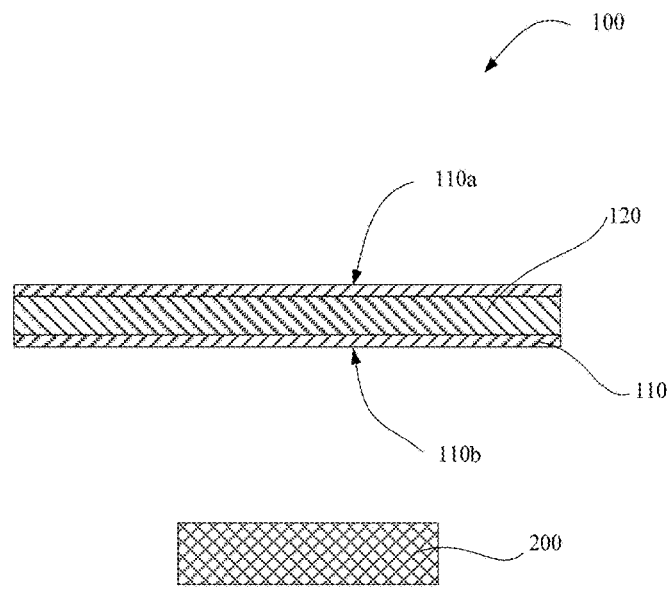
FIG. 3 is a schematic structural view of a housing assembly provided in a third implementation of the present disclosure.

FIG. 3 is a schematic structural view of the housing assembly provided in a third implementation of the present disclosure. The housing assembly 100 includes the dielectric substrate 110 and the radio-wave transparent structure 120. The dielectric substrate 110 has the first equivalent wave impedance to the RF signal in the preset frequency band. The first equivalent wave impedance differs from the wave impedance in the free space by the first difference. The radio-wave transparent structure 120 is carried on the dielectric substrate 110 and at least partially covers a portion of the dielectric substrate 110. The housing assembly 100 has the second equivalent wave impedance to the RF signal in the preset frequency band in the region corresponding to the radio-wave transparent structure 120. The second wave impedance differs from the wave impedance in the free space by the second difference. The second difference is less than the first difference. In this implementation, the radio-wave transparent structure 120 is embedded in the dielectric substrate 110. In a case where the housing assembly 100 is applied to the electronic device 1, the electronic device 1 further includes the antenna module 200, and the first surface 110a is further away from the antenna module 200 than the second surface 110b.

FIG. 4 is a schematic structural view of the housing assembly provided in a fourth implementation of the present disclosure. The housing assembly 100 includes the dielectric substrate 110 and the radio-wave transparent structure 120. The dielectric substrate 110 has the first equivalent wave impedance to the RF signal in the preset frequency band. The first equivalent wave impedance differs from the wave impedance in the free space by the first difference. The radio-wave transparent structure 120 is carried on the dielectric substrate 110 and at least partially covers a portion of the dielectric substrate 110. The housing assembly 100 has the second equivalent wave impedance to the RF signal in the preset frequency band in the region corresponding to the radio-wave transparent structure 120. The second wave impedance differs from the wave impedance in the free space by the second difference. The second difference is less than the first difference. In an example, the housing assembly 100 may further include a bearing film 130. The bearing film 130 is configured to carry the radio-wave transparent structure 120. The bearing film 130 is disposed on one side of the radio-wave transparent structure 120 away from the adhesive layer 140. The bearing film 130 may be, but is not limited to, a plastic (for example, polyethylene terephthalate (PET)) film, a flexible circuit board, a printed circuit board, or the like. The PET film may be, but is not limited to, a color film, an explosion-proof film, or the like. In an example, the radio-wave transparent structure 120 is prepared on the bearing film 130. During preparation of the radio-wave transparent structure 120, the bearing film 130 can act as a support for the radio-wave transparent structure 120. After preparation, the radio-wave transparent structure 120 can be bonded on the dielectric substrate 110 via the adhesive layer 140. The bearing film 130 is disposed on one side of radio-wave transparent structure 120 away from the adhesive layer 140, so as to protect the radio-wave transparent structure 120. Further, the dielectric substrate 110 has the first surface 110a and the second surface 110b opposite to the first surface 110a. The first surface 110a is further away from the antenna module 200 than the second surface 110b. Referring to FIG. 4, as a non-limiting implementation, the radio-wave transparent structure 120 is attached to the first surface 110a via the adhesive layer 140. It is noted that, in other implementations, the radio-wave transparent structure 120 may be bonded on the second surface 110b via the adhesive layer 140. Experiments show that, the greater a thickness of the bearing film 130, the more the preset frequency band shifts towards a low frequency side.

Figure 5:
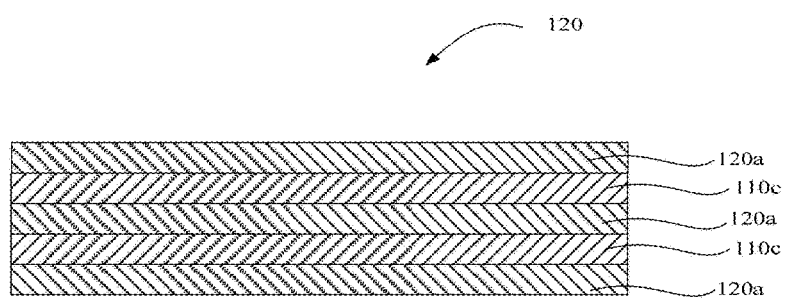
FIG. 5 is a schematic view of a radio-wave transparent structure provided in the first implementation of the present disclosure.

FIG. 5 is a schematic view of the radio-wave transparent structure provided in the first implementation of the present disclosure. The radio-wave transparent structure 120 can include one or more radio-wave transparent layers 120a. When the radio-wave transparent structure 120 includes multiple radio-wave transparent layers 120a, the multiple radio-wave transparent layers 120a are stacked and spaced apart from each other in a predetermined direction. When the radio-wave transparent structure 120 includes the multiple radio-wave transparent layers 120a, a dielectric layer 110c is sandwiched between each two adjacent radio-wave transparent layers 120a, and all the dielectric layers 110c form the dielectric substrate 110. Referring to FIG. 5, as a non-limiting implementation, the radio-wave transparent structure 120 includes three radio-wave transparent layers 120a and two dielectric layers 110c. Further, the predetermined direction is parallel to a radiation direction of a main lobe of the RF signal. The so-called main lobe refers to a beam with the maximum radiation intensity in the RF signal.

Figure 6:
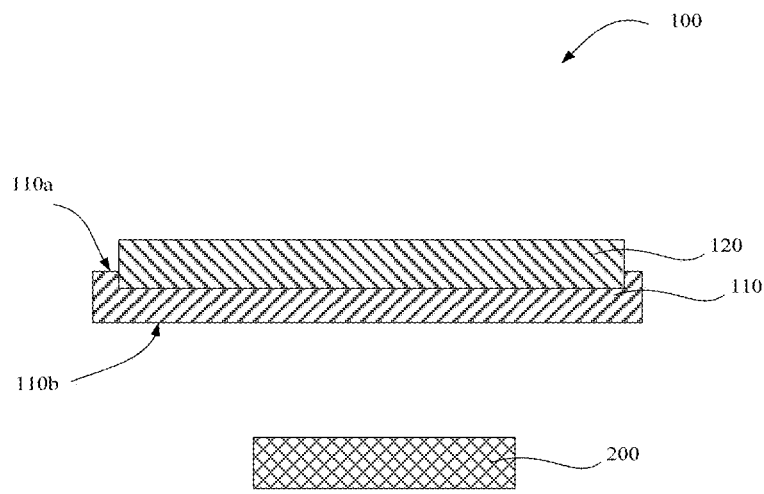
FIG. 6 is a schematic structural view of a housing assembly provided in a fifth implementation of the present disclosure.

FIG. 6 is a schematic structural view of the housing assembly provided in a fifth implementation of the present disclosure. The dielectric substrate 110 has the first surface 110a and the second surface 110b opposite to the first surface 110a. A part of the radio-wave transparent structure 120 is disposed on the first surface 110a, and the remaining part of the radio-wave transparent structure 120 is embedded in the dielectric substrate 110. In a case where the housing assembly 100 is applied to the electronic device, the electronic device further includes the antenna module 200, and the first surface 110a is further away from the antenna module 200 than the second surface 110b.

In combination with the housing assembly 100 provided in any of the foregoing implementations, the radio-wave transparent structure 120 is made of a metal material or a non-metal conductive material.

In combination with the housing assembly 100 provided in any of the foregoing implementations, the dielectric substrate 110 is made of plastic, glass, sapphire, or ceramic. Alternatively, the dielectric substrate 110 is made of a combination of at least two of plastic, glass, sapphire, or ceramic.

Figure 7:
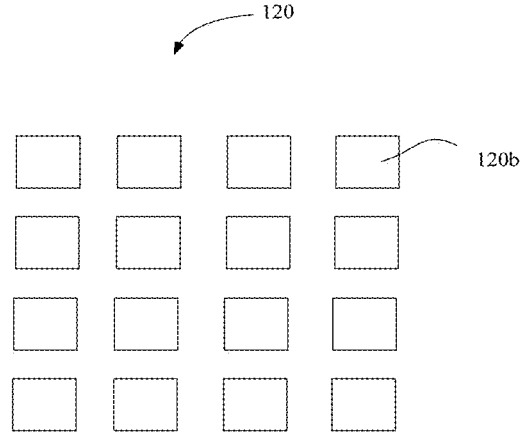
FIG. 7 is a schematic view of a radio-wave transparent structure provided in the second implementation of the present disclosure.

FIG. 7 is a schematic view of the radio-wave transparent structure provided in the second implementation of the present disclosure. The radio-wave transparent structure 120 may be combined with the housing assembly 100 provided in any of the foregoing implementations. The radio-wave transparent structure 120 can include multiple resonance elements 120b arranged at regular intervals.

Figure 8:
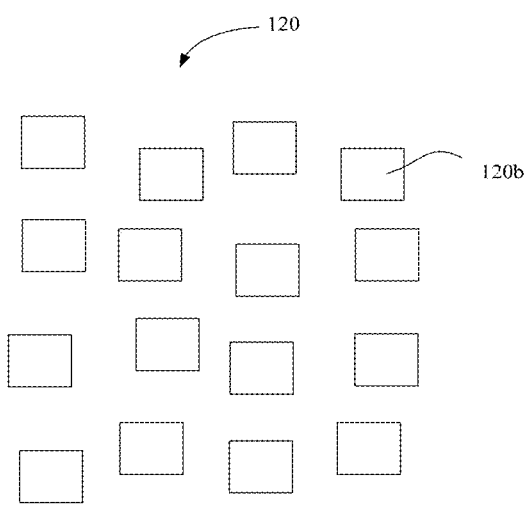
FIG. 8 is a schematic view of a radio-wave transparent structure provided in the third implementation of the present disclosure.

FIG. 8 is a schematic view of the radio-wave transparent structure provided in the third implementation of the present disclosure. The radio-wave transparent structure 120 may be combined with the housing assembly 100 provided in any of the foregoing implementations. The radio-wave transparent structure 120 includes multiple resonance elements 120b, and the resonance elements 120b are not arranged at regular intervals.

Figure 9:
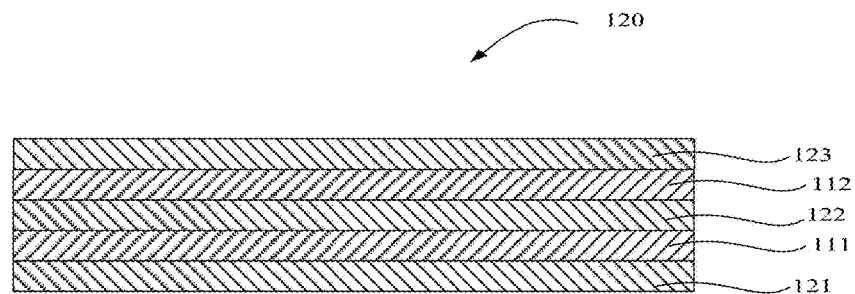
FIG. 9 is a schematic cross-sectional view of a radio-wave transparent structure provided in the fourth implementation of the present disclosure.
Figure 10:
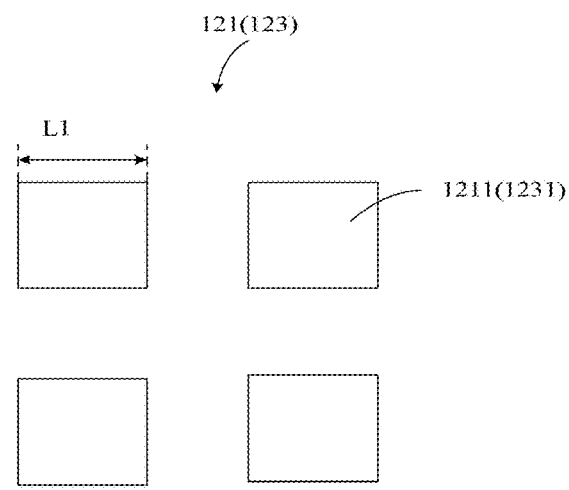
FIG. 10 is a schematic structural view of a first radio-wave transparent layer of the radio-wave transparent structure provided in the fourth implementation of the present disclosure.
Figure 11:
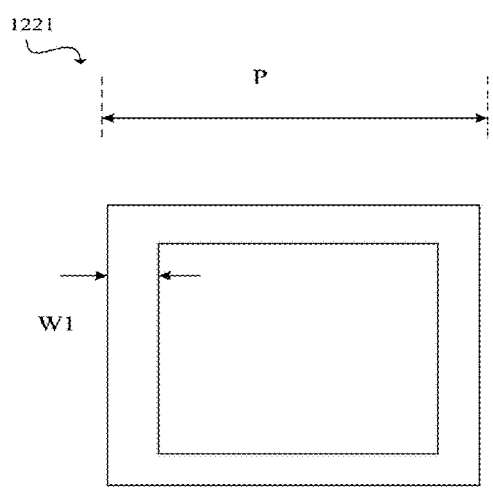
FIG. 11 is a schematic structural view of a second radio-wave transparent layer of the radio-wave transparent structure provided in the fourth implementation of the present disclosure.

FIG. 9 is a schematic cross-sectional view of the radio-wave transparent structure provided in the fourth implementation of the present disclosure. FIG. 10 is a schematic structural view of a first radio-wave transparent layer of the radio-wave transparent structure provided in the fourth implementation of the present disclosure. FIG. 11 is a schematic structural view of the second radio-wave transparent layer of the radio-wave transparent structure provided in the fourth implementation of the present disclosure. The radio-wave transparent structure 120 may be combined with the housing assembly 100 provided in any of the foregoing implementations. The radio-wave transparent structure 120 can include the first radio-wave transparent layer 121, the second radio-wave transparent layer 122, and the third radio-wave transparent layer 123 spaced apart from one another. The dielectric substrate 110 can include the first dielectric layer 111 and the second dielectric layer 112. The first radio-wave transparent layer 121, the first dielectric layer 111, the second radio-wave transparent layer 122, the second dielectric layer 112, and the third radio-wave transparent layer 123 are stacked in sequence. The first radio-wave transparent layer 121 may include multiple first patches 1211 arranged in an array. The second radio-wave transparent layer 122 may include multiple mesh-grid structures 1221 arranged at regular intervals. The third radio-wave transparent layer 123 may include multiple second patches 1231 arranged in an array. In an implementation, as illustrated in FIG. 10, an orthographic projection of the first patches 1211 on the second radio-wave transparent layer 122 overlaps with an orthographic projection of the second patches 1231 on the second radio-wave transparent layer 122. The larger a size L1 of the first patche 1211 or the second patche 1231, the more the preset frequency band shifts towards a low frequency side and the narrower a bandwidth of the preset frequency band. The smaller a width W1 of a conductive line of the mesh-grid structure 1221 of the second radio-wave transparent layer 122, the more the preset frequency band shifts towards the low frequency side and the wider the bandwidth of the preset frequency band. The larger a period P of the radio-wave transparent structure 120, the more the preset frequency band shifts towards a high frequency side and the wider the bandwidth of the preset frequency band. The thicker the radio-wave transparent structure 120, the more the preset frequency band shifts towards the low frequency side and the narrower the bandwidth of the preset frequency band. The greater a dielectric constant of the dielectric substrate 110, the more the preset frequency band shifts towards the low frequency side and the narrower the bandwidth of the preset frequency band. In this implementation, one mesh-grid structure 1221 is disposed corresponding to four first patches 1211 and four second patches 1231, and serves as one period of the radio-wave transparent structure 120.

Figure 53:
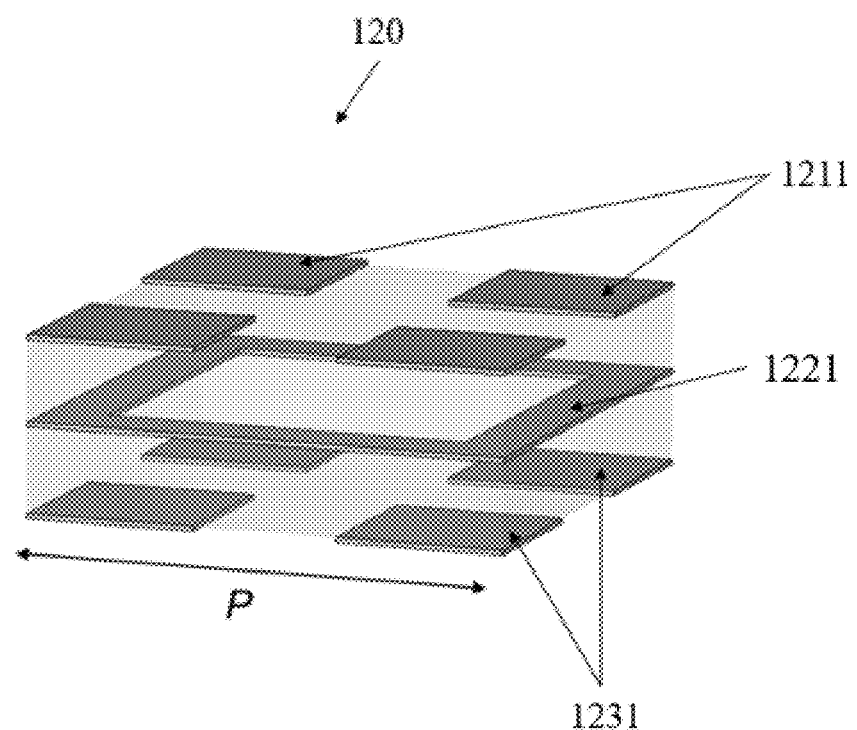
FIG. 53 is schematic structural view of a radio-wave transparent structure according to an implementation of the present disclosure.

Referring to FIG. 53, as an implementation, an orthographic projection of the mesh-grid structure 1221 of the second radio-wave transparent layer 122 on the dielectric substrate 110 at least partially overlaps with an orthographic projection of the first patches 1211 of the first wave transmission layer 121 on the dielectric substrate 110. The orthographic projection of the mesh-grid structure 1221 of the second radio-wave transparent layer 122 on the dielectric substrate 110 at least partially overlaps with an orthographic projection of the second patches 1231 of the third radio-wave transparent layer 123 on the dielectric substrate 110.

Figure 12:
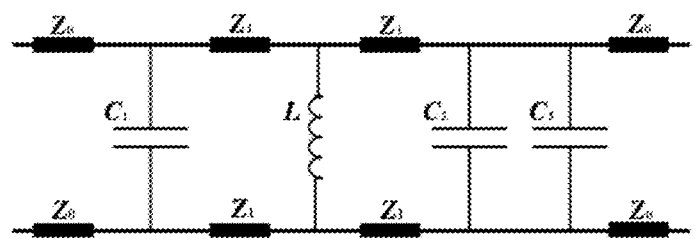
FIG. 12 is an equivalent circuit diagram of the radio-wave transparent structure provided in the fourth implementation of the present disclosure.

FIG. 12 is an equivalent circuit diagram of the radio-wave transparent structure provided in the fourth implementation of the present disclosure. In this equivalent circuit diagram, factors that have less effects on the preset frequency band are ignored, such as an inductance of the first radio-wave transparent layer 121, an inductance of the third radio-wave transparent layer 123, and a capacitance of the second radio-wave transparent layer 122. In this equivalent circuit diagram, the first radio-wave transparent layer 121 is equivalent to Capacitor C1, the second radio-wave transparent layer 122 is equivalent to Capacitor C2, a coupling capacitance between the first radio-wave transparent layer 121 and the second radio-wave transparent layer 122 is equivalent to Capacitor C3, and the third radio-wave transparent layer 123 is equivalent to Inductance L. In addition, Z0 represents an impedance of the free space, Z1 represents an impedance of the dielectric substrate 110, and $Z1=Z0/(Dk)^{1/2}$. The preset frequency band has a center frequency f0, and $f0=1/[2\pi/(LC)^{1/2}]$. A ratio of a bandwidth $\Delta f$ to the center frequency f0 is proportional to $(L/C)^{1/2}$. It can be seen that, as the size of the first patche 1211 or the second patche 1231 increases, the preset frequency band shifts towards the low frequency side and a bandwidth of the preset frequency band decreases. As the width of the mesh-grid structure 1221 of the second radio-wave transparent layer 122 decreases, the preset frequency band shifts towards the low frequency side and the bandwidth of the preset frequency band increases. As the period of the radio-wave transparent structure 120 increases, the preset frequency band shifts towards the high frequency side and the bandwidth of the preset frequency band increases. As the thickness of the radio-wave transparent structure 120 increases, the preset frequency band shifts towards the low frequency side and the bandwidth of the preset frequency band decreases. As the dielectric constant of the dielectric substrate 110 increases, the preset frequency band shifts towards the low frequency side and the bandwidth of the preset frequency band decreases.

In an implementation, the first dielectric layer 111 and the second dielectric layer 112 are made of glass which generally has a dielectric constant falling within a range from 6 to 7.6. When the preset frequency band is in a range of 20 GHz to 35 GHz, the first patch 1211 generally has a size falling within a range from 0.5 mm to 0.8 mm. A solid part of the mesh-grid structure of the second radio-wave transparent structure 128 generally has a width falling within a range from 0.1 mm to 0.5 mm. One period generally has a length falling within a range from 1.5 mm to 3 mm. When the radio-wave transparent structure 120 is applied to a battery cover of an electronic device, a distance between an upper surface of the antenna module 200 and an inner surface of the battery cover is generally greater than or equal to zero, and in an implementation, the distance is generally from 0.5 mm to 1.2 mm.

Figure 13:
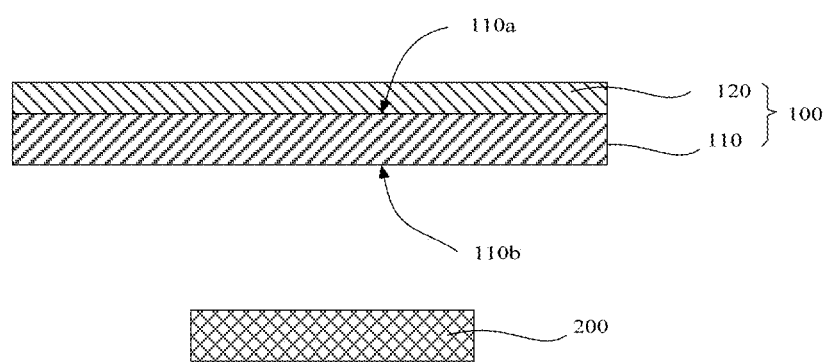
FIG. 13 is a schematic structural view of an antenna assembly provided in the first implementation of the present disclosure.

FIG. 13 is a schematic structural view of the antenna assembly provided in the first implementation of the present disclosure. The antenna assembly 10 includes the antenna module 200 and the housing assembly 100. The antenna module 200 is configured to emit and receive, within the preset direction range, the RF signal in the preset frequency band, and the radio-wave transparent structure 120 of the housing assembly 100 is at least partially within the preset direction range. For the housing assembly 100, reference can be made to the housing assembly 100 described in the foregoing implementations, and details are not described herein again. For ease of description, the housing assembly 100 provided in the first implementation is taken for illustration as an example of the antenna assembly 10 in this implementation.

Figure 14:
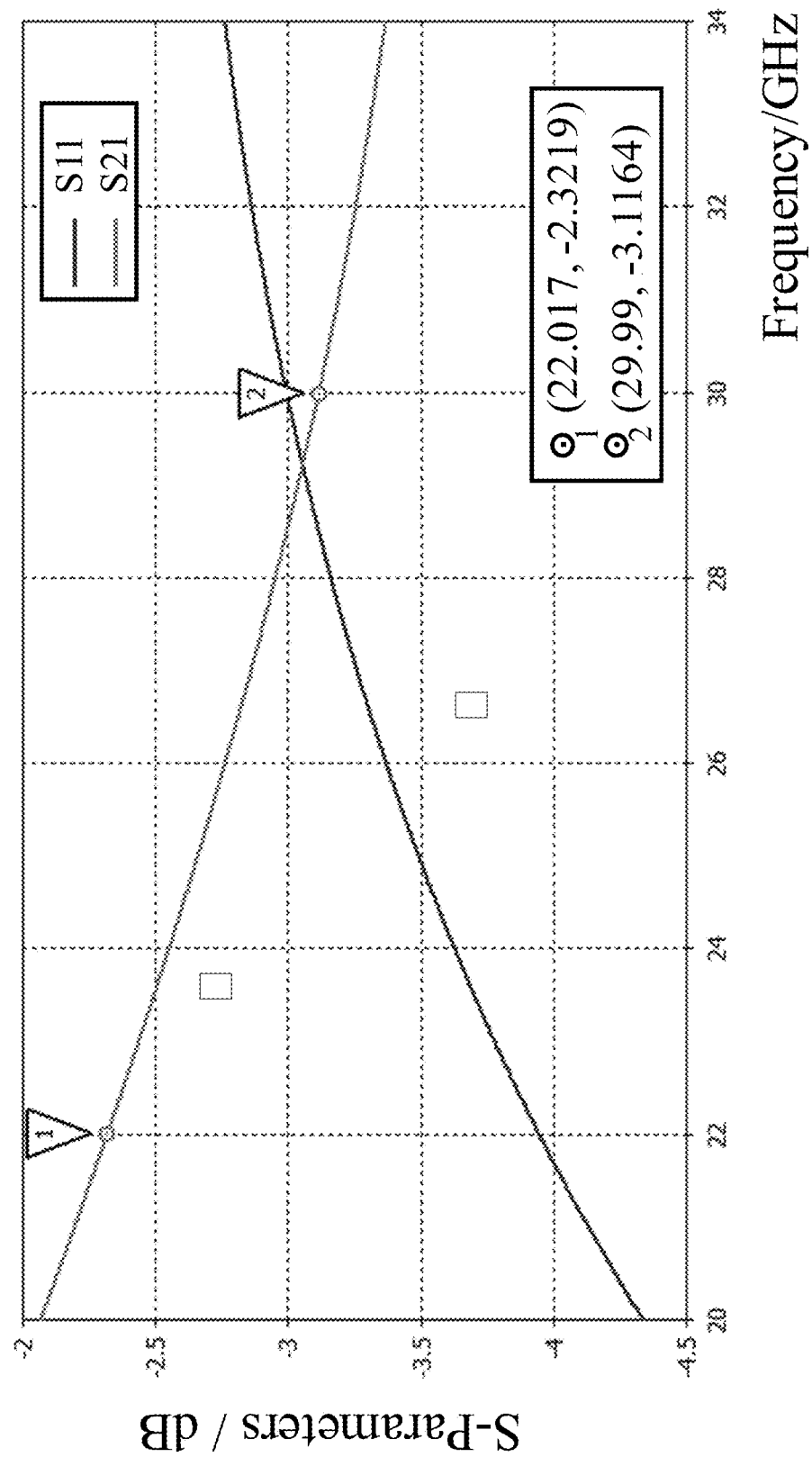
FIG. 14 is a schematic diagram illustrating a curve of reflection coefficient and a curve of transmission coefficient to a radio frequency (RF) signal of 20 GHz to 34 GHz emitted by an antenna module when the antenna module is under a conventional glass battery cover of 0.7 mm.

FIG. 14 is a schematic diagram illustrating a curve of reflection coefficient and a curve of transmission coefficient to an RF signal of 20 GHz to 34 GHz emitted by the antenna module 200 when the antenna module 200 is under a conventional glass battery cover having a thickness of 0.7 mm. In FIG. 14, the horizontal axis represents the frequency in units of GHz, and the vertical axis represents the S-parameters in units of dB. Curve ① represents the curve of reflection coefficient. As can be seen from curve ①, the reflection coefficient is above −10 dB within the frequency range of 20 GHz to 34 GHz, that is, a reflection to the RF signal is relatively great, and as the frequency increases, the reflection increases. Curve ② represents the curve of transmission coefficient. As can be seen from curve ②, a transmission coefficient is below −2.3 dB within the frequency range of 20 GHz to 30 GHz. As can be seen from curve ① and curve ②, when the antenna module is disposed under the conventional glass battery cover, the reflection and the transmission loss are great.

Figure 15:
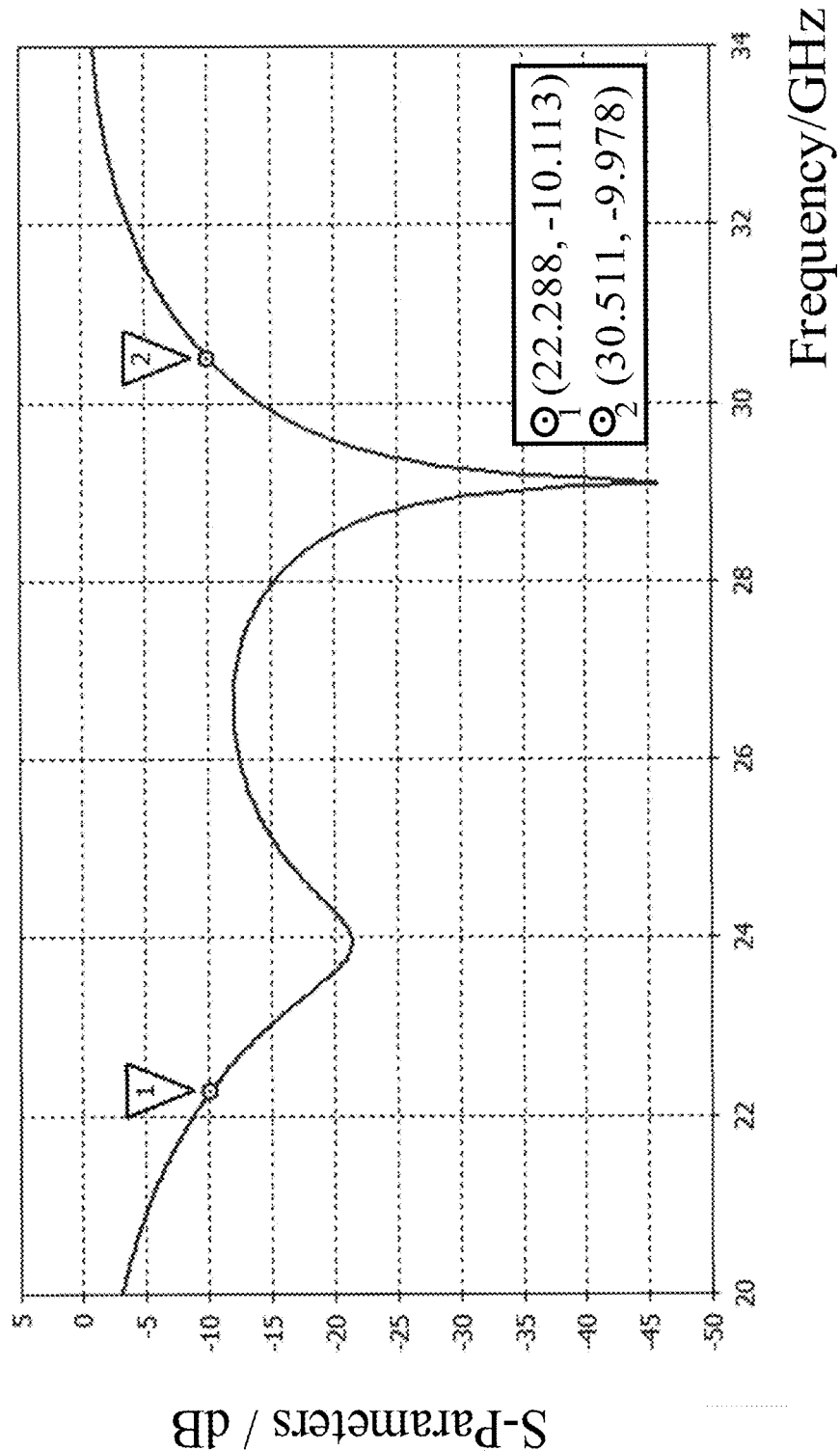
FIG. 15 is a schematic diagram illustrating a curve of reflection coefficient when an antenna module is under a battery cover provided with a radio-wave transparent structure.
Figure 16:
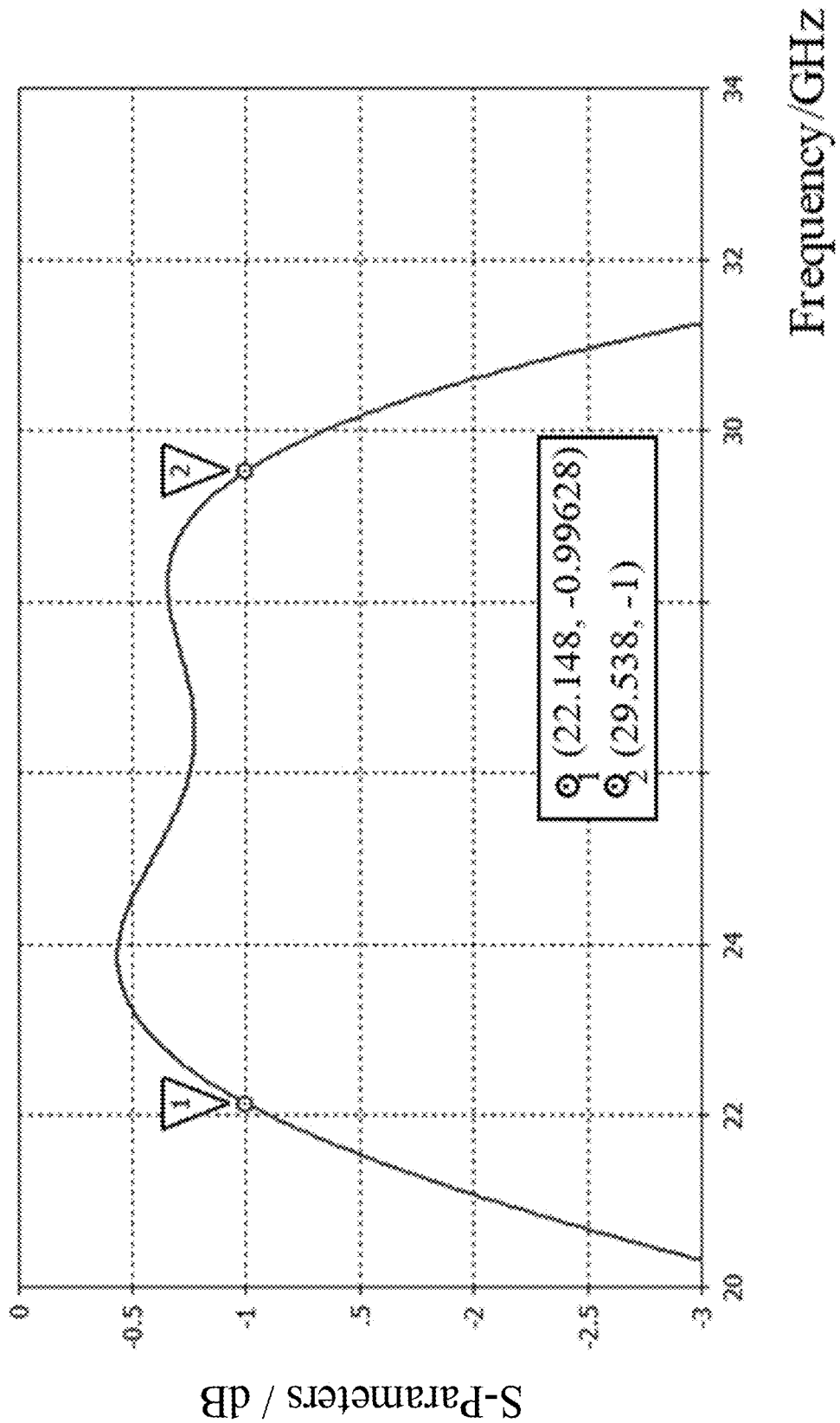
FIG. 16 is a schematic diagram illustrating a curve of transmission coefficient when an antenna module is under a battery cover provided with a radio-wave transparent structure.

FIG. 15 is a schematic diagram illustrating a curve of reflection coefficient when the antenna module is under the battery cover provided with the radio-wave transparent structure. FIG. 16 is a schematic diagram illustrating a curve of transmission coefficient when the antenna module is under the battery cover provided with the radio-wave transparent structure. In FIG. 15, the horizontal axis represents the frequency in units of GHz, and the vertical axis represents the S-parameters in units of dB. The battery cover has a relative small reflection coefficient within a frequency range at which the reflection coefficient is less than or equal to −10 dB. Thus, the frequency range where the reflection coefficient is less than or equal to −10 dB is defined as the operating frequency range of the antenna module. As can be seen from the curve in FIG. 15, the antenna module 200 has the operating frequency range of 22.288 GHz to 30.511 GHz. In FIG. 16, the horizontal axis represents the frequency in units of GHz, and the vertical axis represents the S-parameters in units of dB. The battery cover has a great transmission coefficient within a frequency range where the transmission coefficient is greater than −1 dB. As can be seen from the curve in FIG. 16, the battery cover has a great transmission coefficient within a frequency range of 22.148 GHz to 29.538 GHz.

Figure 17:
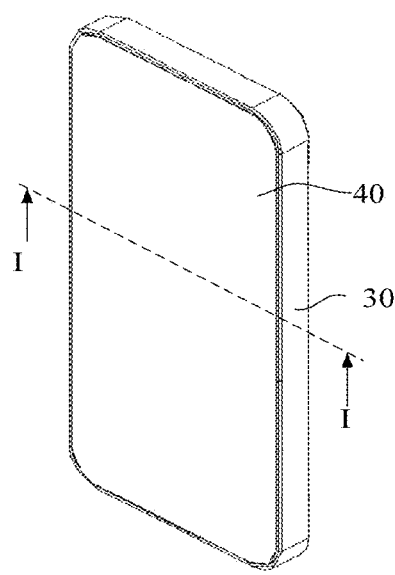
FIG. 17 is a schematic structural view of an electronic device provided in a first implementation of the present disclosure.
Figure 18:
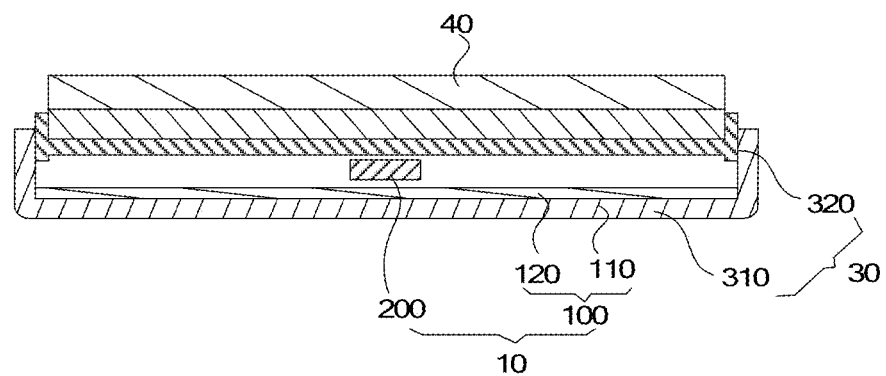
FIG. 18 is a schematic cross-sectional structural view of the electronic device illustrated in FIG. 17, along line I-I.

FIG. 17 is a schematic structural view of the electronic device provided in the first implementation of the present disclosure. FIG. 18 is a schematic cross-sectional structural view of the electronic device illustrated in FIG. 17, along line I-I. The electronic device 1 includes the antenna assembly 10. For the antenna assembly 10, reference can be made to the foregoing implementations, and details are not described herein again. The dielectric substrate 110 includes the battery cover 30 of the electronic device 1. The battery cover 30 and a screen 40 together define an accommodation space. The accommodation space is used to accommodate functional elements of the electronic device 1. The electronic device 1 includes the antenna assembly 10 of any of the forgoing implementations.

As illustrated in FIG. 17 and FIG. 18, the dielectric substrate 110 includes the battery cover 30 of the electronic device 1, the battery cover 30 of the electronic device 1 includes a rear plate 310 and a frame 320 bent and extended from a periphery of the rear plate 310, and the radio-wave transparent structure 120 is disposed corresponding to the rear plate 310.

The electronic device 1 includes, but is not limited to, an electronic device with a breathing light function, such as a smart phone, a mobile internet device (MID), an e-book, a play station portable (PSP), or a personal digital assistant (PDA). The electronic device 1 provided in the present disclosure is described in detail below.

Figure 19:
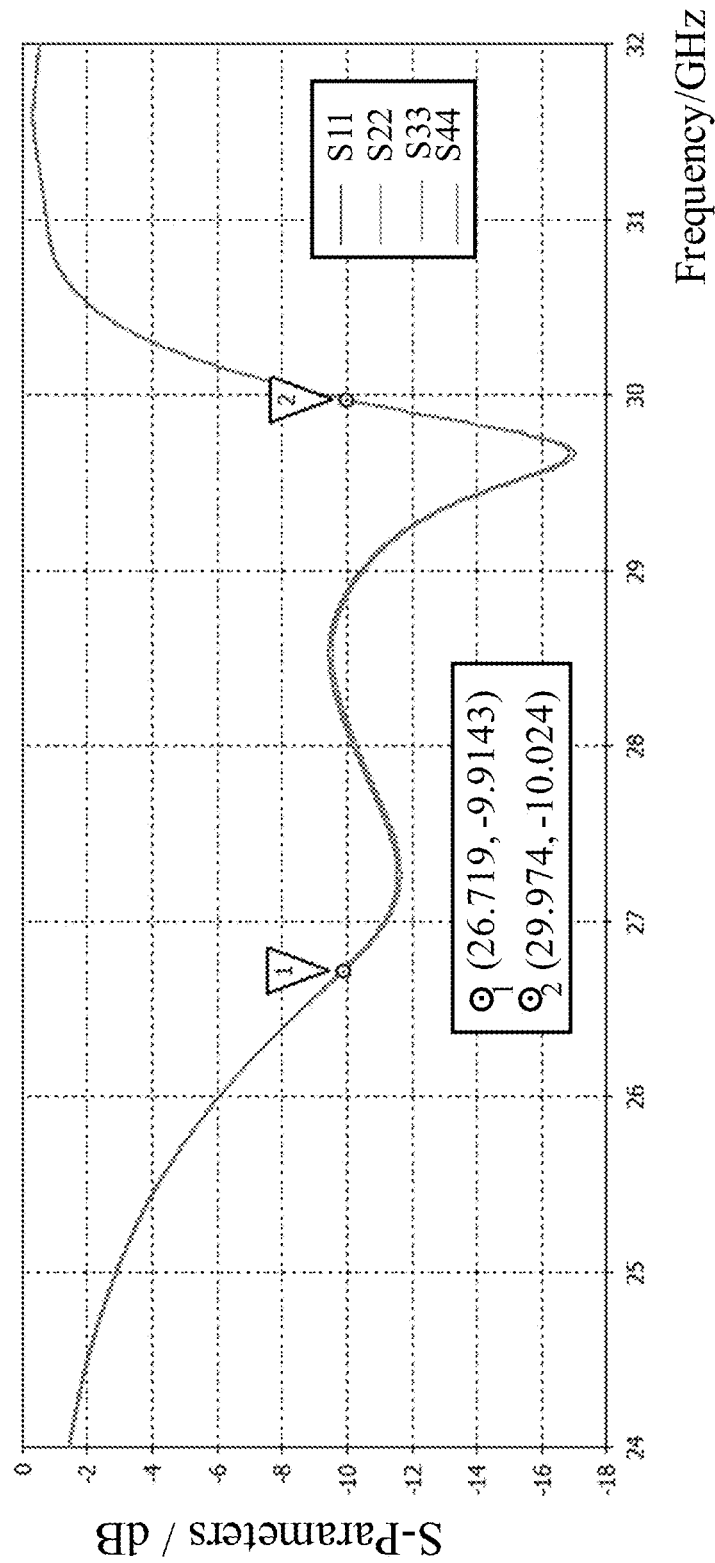
FIG. 19 is a schematic diagram illustrating a reflection coefficient of an antenna module in free space.
Figure 20:
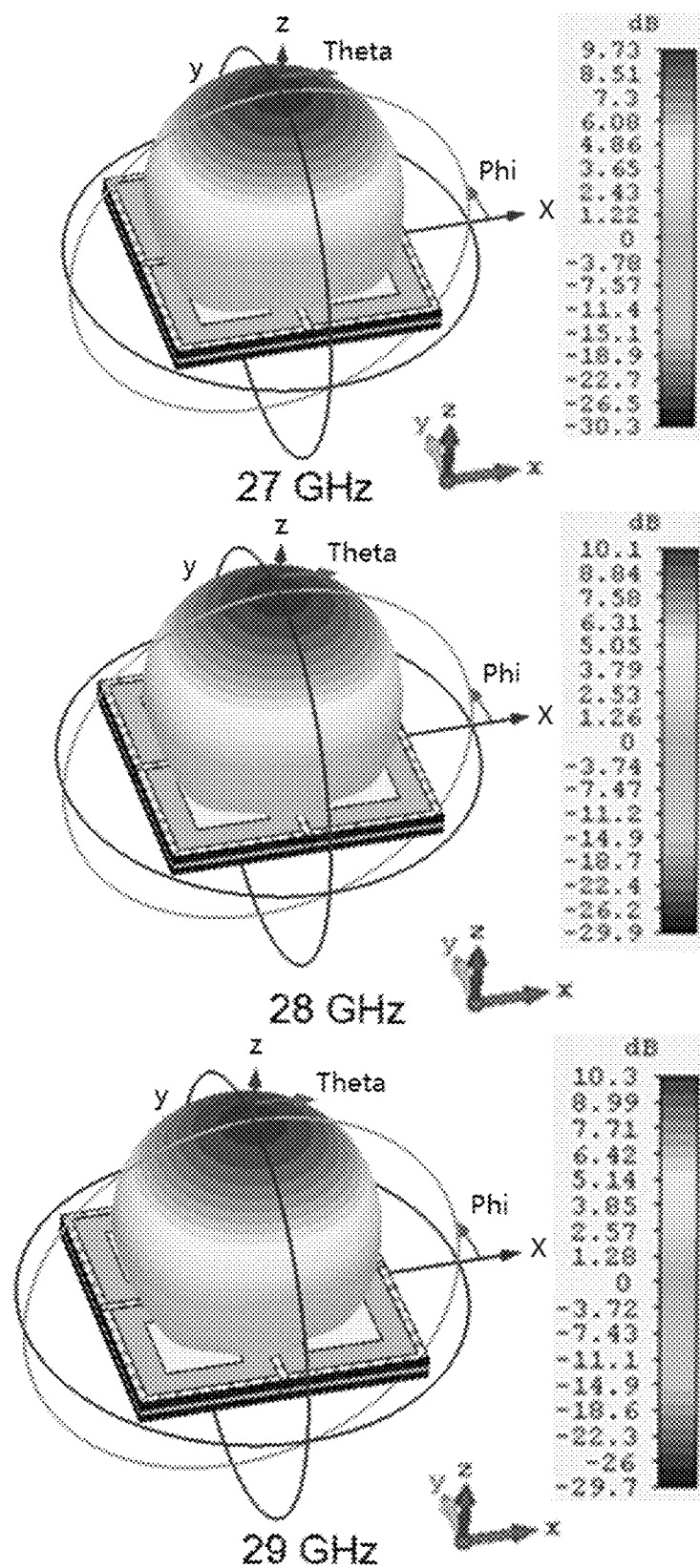
FIG. 20 illustrates radiation patterns of an antenna module in free space.

FIG. 19 is a schematic diagram illustrating a reflection coefficient of the antenna module in the free space. FIG. 20 illustrates radiation patterns of the antenna module in the free space. In FIG. 19 and FIG. 20, an example that the antenna module has 2×2 antenna element array is taken for simulation. In FIG. 19, the horizontal axis represents the frequency in units of GHz, and the vertical axis represents the S-parameters in units of dB. A frequency range where a curve has the reflection coefficient less than or equal to −10 dB is taken as an operating frequency range of the antenna module. As illustrated in FIG. 19, the antenna module 200 has the operating frequency range of 26.71 GHz to 29.974 GHz. As illustrated in FIG. 20, the antenna module has relatively high gains at frequencies of 27 GHz, 28 GHz, and 29 GHz. The antenna module 200 has a gain of 9.73 dB at the frequency of 27 GHz, a gain of 10.1 dB at the frequency of 28 GHz, and a gain of 10.3 dB at the frequency of 29 GHz. It can be seen that the antenna module 200 has relatively great gains at the frequencies of 27 GHz, 28 GHz, and 29 GHz. It is noted that due to a symmetrical design of the antenna module 200 of 2×2 array, curves of the S-parameters of the four antenna elements of the antenna module 200 of 2×2 array in the free space coincide with each other. S11, S22, S33, and S44 in FIG. 19 respectively represent the S-parameters of the four antenna elements of the antenna module 200 of 2×2 array.

Figure 21:
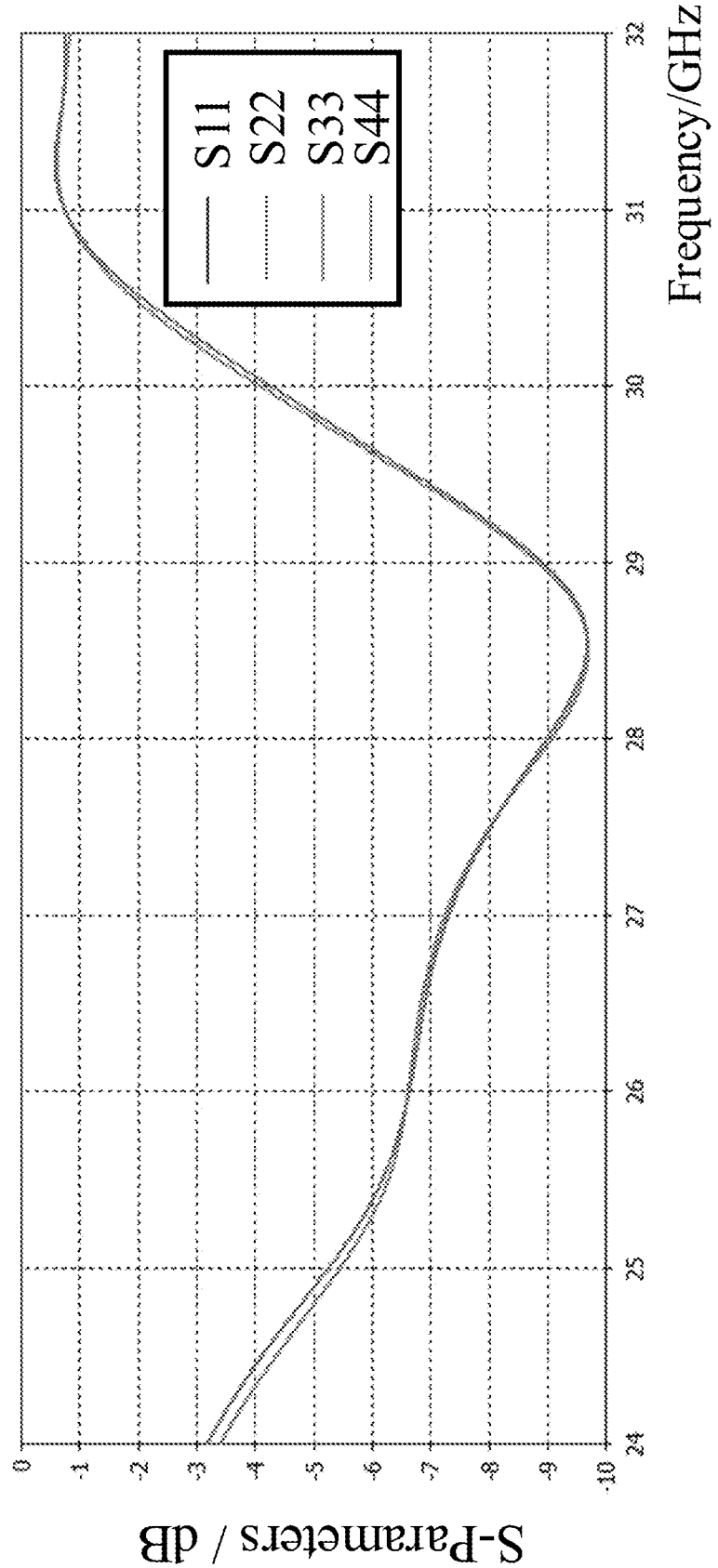
FIG. 21 is a schematic diagram illustrating a reflection coefficient of an antenna module disposed under a conventional battery cover.
Figure 22:
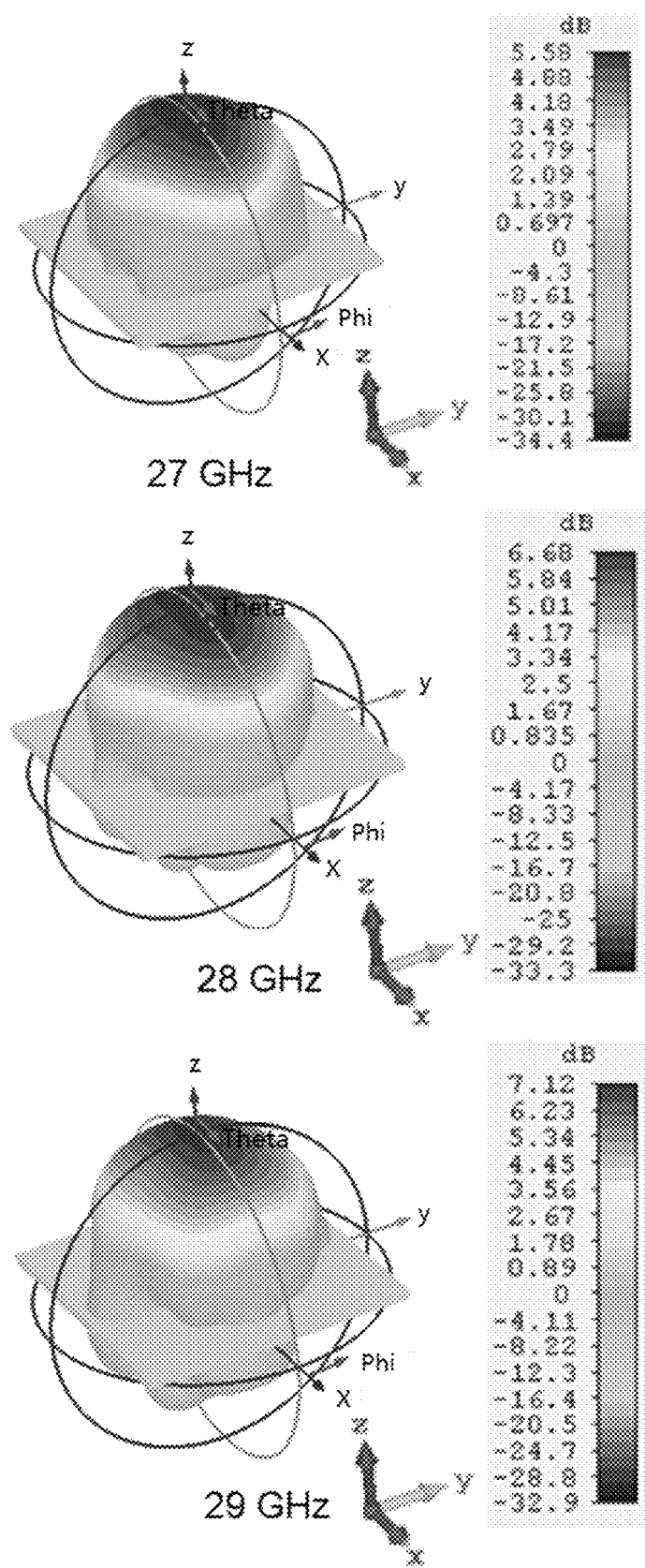
FIG. 22 illustrates radiation patterns of an antenna module disposed under a conventional battery cover.

FIG. 21 is a schematic diagram illustrating a reflection coefficient of the antenna module disposed under a conventional battery cover. FIG. 22 illustrates radiation patterns of the antenna module disposed under the conventional battery cover. In FIG. 21 and FIG. 22, an example that the antenna module 200 has 2×2 antenna element array is taken for simulation. In FIG. 21, the horizontal axis represents the frequency in units of GHz, and the vertical axis represents the S-parameters in units of dB. A frequency range where a curve has the reflection coefficient less than or equal to −10 dB is taken as an operating frequency range of the antenna module. As illustrated in FIG. 21, the reflection coefficients of the RF signals in a frequency range of 24 GHz to 32 GHz are all above −10 dB, that is, amounts of reflections to the RF signals in the frequency range of 24 GHz to 32 GHz are great. As illustrated in FIG. 22, the antenna module 200 has a gain of 5.58 dB at a frequency of 27 GHz, a gain of 6.68 dB at a frequency of 28 GHz, and a gain of 7.12 dB at a frequency of 29 GHz. It can be seen that a relatively great reflection coefficient and a relatively small gain are obtained when the antenna module is disposed under the traditional battery cover.

It is noted that due to a symmetrical design of the antenna module 200 of 2×2 array, as illustrated in FIG. 21, a curve of the reflection coefficient S11 coincides with a curve of the reflection coefficient S33, and a curve of the reflection coefficient S22 coincides with a curve of the reflection coefficient S44. S11, S22, S33, and S44 as shown respectively represent reflection coefficient of the four antenna elements of the antenna module 200 of 2×2 array.

Figure 23:
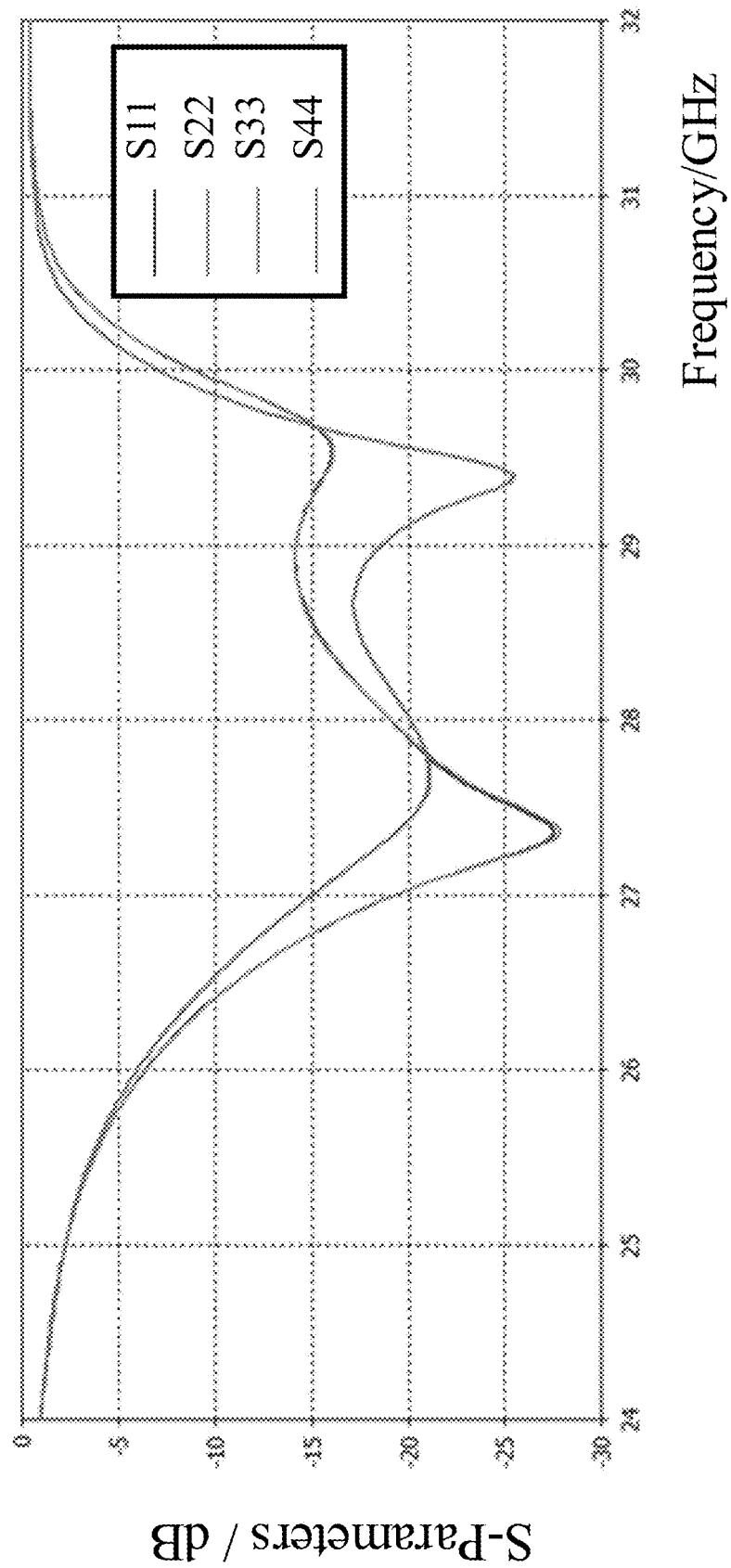
FIG. 23 is a schematic diagram illustrating a reflection coefficient of an antenna module disposed under a battery cover provided in the present disclosure.
Figure 24:
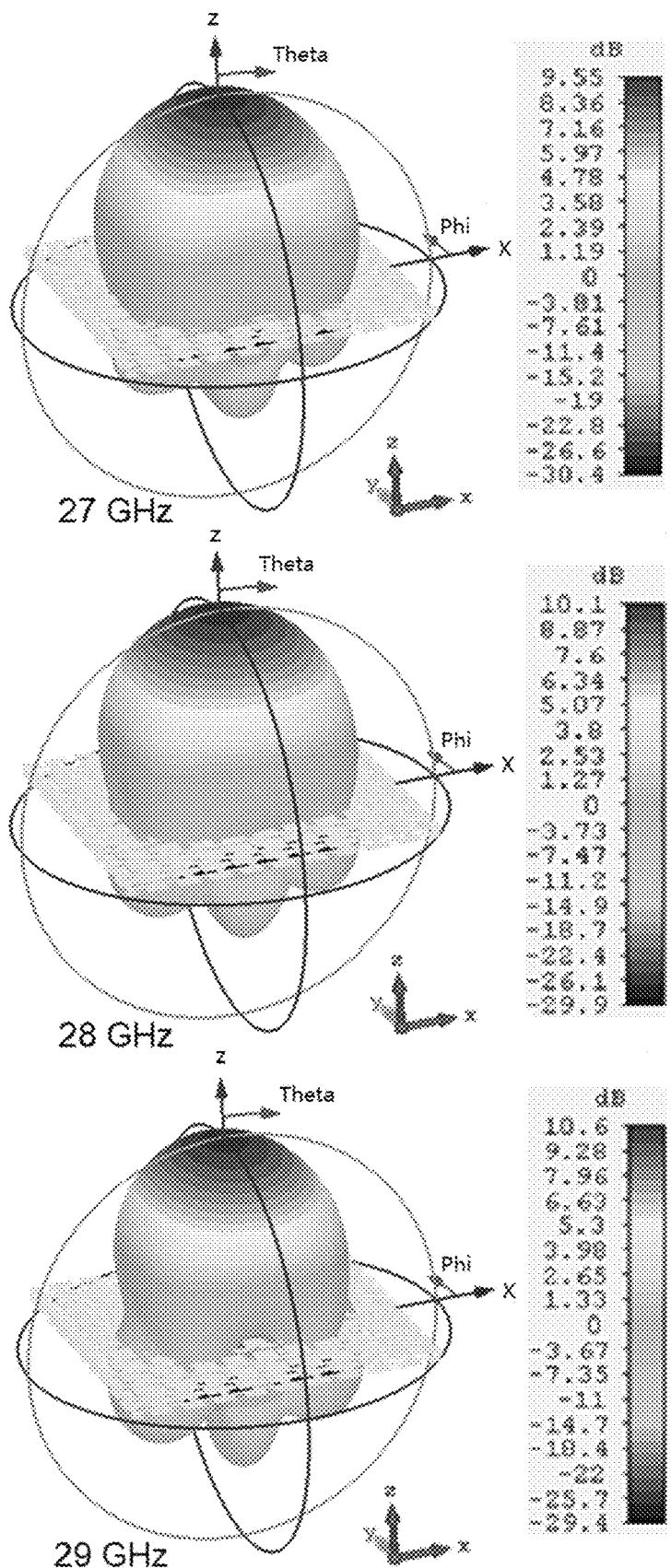
FIG. 24 illustrates radiation patterns of an antenna module disposed under a battery cover provided in the present disclosure.

FIG. 23 is a schematic diagram illustrating a reflection coefficient of the antenna module disposed under the battery cover provided in the present disclosure. FIG. 24 illustrates radiation patterns of the antenna module disposed under the battery cover provided in the present disclosure. In FIG. 23 and FIG. 24, an example that the antenna module 200 has 2×2 antenna element array is taken for simulation. In FIG. 23, the horizontal axis represents the frequency in units of GHz, and the vertical axis represents the S-parameters in units of dB. A frequency range where a curve has the reflection coefficient less than or equal to −10 dB is taken as an operating frequency range of the antenna module. As can be seen from the curve illustrated in FIG. 23, the antenna module 200 has a relatively great operating frequency range. As illustrated in FIG. 24, the antenna module 200 has a gain of 9.55 dB at a frequency of 27 GHz, a gain of 10.1 dB at a frequency of 28 GHz, and a gain of 10.6 dB at a frequency of 29 GHz. It can be seen that the antenna module 200 has a relatively great operating frequency range and a relatively great gain when being disposed under the battery cover 30 provided in the present disclosure, which are substantially the same as the operating frequency range and the gain when being disposed in the free space.

It is noted that due to a symmetrical design of the antenna module 200 of 2×2 array, as illustrated in FIG. 23, a curve of the reflection coefficient S11 coincides with a curve of the reflection coefficient S33, and a curve of the reflection coefficient S22 coincides with a curve of the reflection coefficient S44. S11, S22, S33, and S44 as shown respectively represent return losses of the four antenna elements of the antenna module 200 of 2×2 array.

Figure 25:
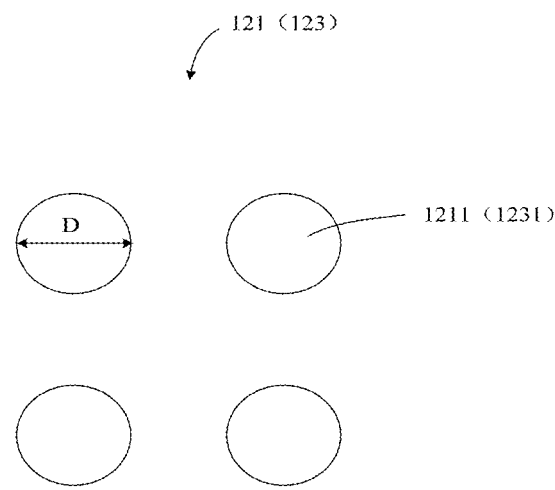
FIG. 25 is a schematic view of a first radio-wave transparent layer of a radio-wave transparent structure provided in a fifth implementation of the present disclosure.

FIG. 25 is a schematic view of the first radio-wave transparent layer of the radio-wave transparent structure provided in a fifth implementation of the present disclosure. The radio-wave transparent structure 120 in this implementation is substantially identical to the radio-wave transparent structure 120 in the fourth implementation except the following. Each first patch 1211 in the fourth implementation is rectangular, while the first radio-wave transparent layer 121 in this implementation includes multiple first patches 1211 arranged in an array, and each first patch 1211 in this implementation is in a circular shape. In an implementation, each first patch 1211 has a diameter D falling within a range from 0.5 mm to 0.8 mm.

In this implementation, the third radio-wave transparent layer 123 can include multiple second patches 1231 arranged in an array, and each second patche 1231 can be in a circular shape. In an example, each second patch 1231 may have a diameter D falling within a range from 0.5 mm to 0.8 mm. It is noted that, the third radio-wave transparent layer 123 may be identical to the first radio-wave transparent layer 121 in structure.

Figure 26:
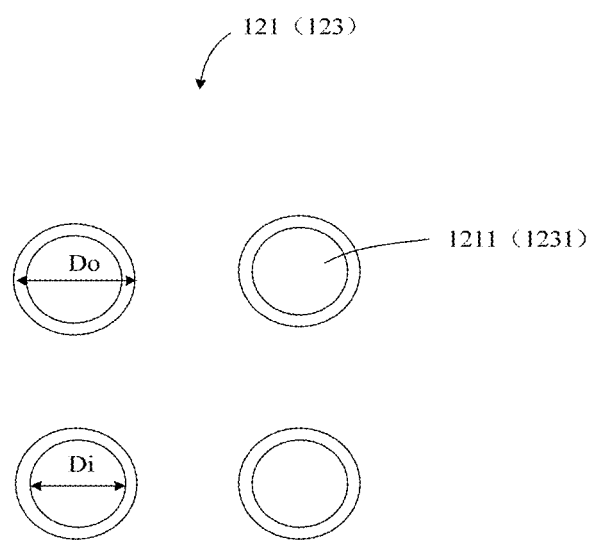
FIG. 26 is a schematic structural view of a first radio-wave transparent layer of a radio-wave transparent structure provided in a sixth implementation of the present disclosure.

FIG. 26 is a schematic structural view of the first radio-wave transparent layer of the radio-wave transparent structure provided in a sixth implementation of the present disclosure. The radio-wave transparent structure 120 in this implementation is substantially identical to the radio-wave transparent structure 120 in the fourth implementation except the following. Each first patch 1211 in the fourth implementation is rectangular, while the first radio-wave transparent layer 121 in this implementation includes multiple first patches 1211 arranged in an array, and each first patch 1211 in this implementation is in a ring shape. When each first patch 1211 is made of metal and in the ring shape, a light transmittance of the radio-wave transparent structure 120 can be improved, that is, a light transmittance (i.e., a transparency) of the housing assembly 100 can be improved. An improvement of the transparency of the housing assembly 100 is beneficial to improving the aesthetics of the electronic device 1. In an implementation, each first patch 1211 in the ring shape may have an outer diameter Do falling within a range from 0.5 mm to 0.8 mm and an inner diameter Di. Generally, the smaller a difference between the outer diameter Do and the inner diameter Di (i.e., Do−Di), the greater the light transmittance of the radio-wave transparent structure 120, and the greater an insertion loss. In other words, the smaller the value of Do−Di, the smaller an area occupied by the first patches 1211, and the larger the transparency of the housing assembly 100 and the larger the insertion loss. In order to balance the light transmittance (i.e., the transparency of the housing assembly 100) and the insertion loss of the radio-wave transparent structure 120, a value of Do−Di is generally greater than or equal to 0.5 mm. It is noted that, the third radio-wave transparent layer 123 may be identical to the first radio-wave transparent layer 121 in structure.

Figure 27:
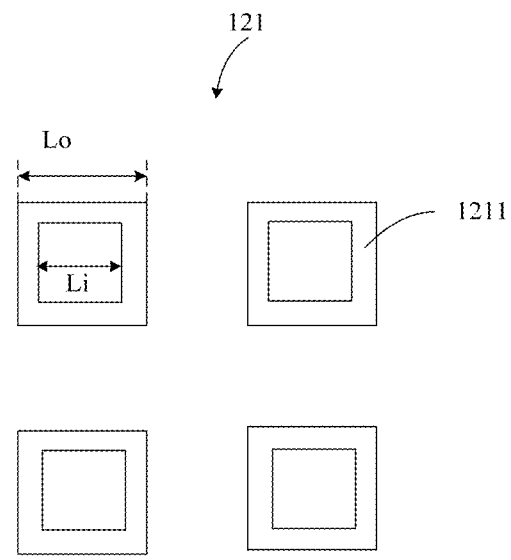
FIG. 27 is a schematic structural view of a first radio-wave transparent layer of a radio-wave transparent structure provided in a seventh implementation of the present disclosure.

FIG. 27 is a schematic structural view of the first radio-wave transparent layer of the radio-wave transparent structure provided in a seventh implementation of the present disclosure. The radio-wave transparent structure 120 in this implementation is substantially identical to the radio-wave transparent structure 120 in the fourth implementation except the following. Each first patch 1211 in the fourth implementation is rectangular, while the first radio-wave transparent layer 121 in this implementation includes multiple first patches 1211 arranged in an array, and each first patch 1211 in this implementation is in a square ring shape. In an implementation, each first patch 1211 generally has an outer side length Lo falling within a range from 0.5 mm to 0.8 mm, and an inner side length Li. Generally, the smaller a value of Lo−Li (i.e., a difference between the outer side length Lo and the inner side length Li), the greater the light transmittance, and the greater the insertion loss. In other words, the smaller the value of Lo−Li, the small an area occupied by the first patches 1211, and the larger the transparency of the housing assembly 100 and the larger the insertion loss. In order to balance the light transmittance (i.e., the transparency of the housing assembly 100) and the insertion loss of the radio-wave transparent structure 120, the value of Lo−Li is generally greater than or equal to 0.5 mm. It is noted that, the third radio-wave transparent layer 123 may be identical to the first radio-wave transparent layer 121 in structure.

Figure 28:
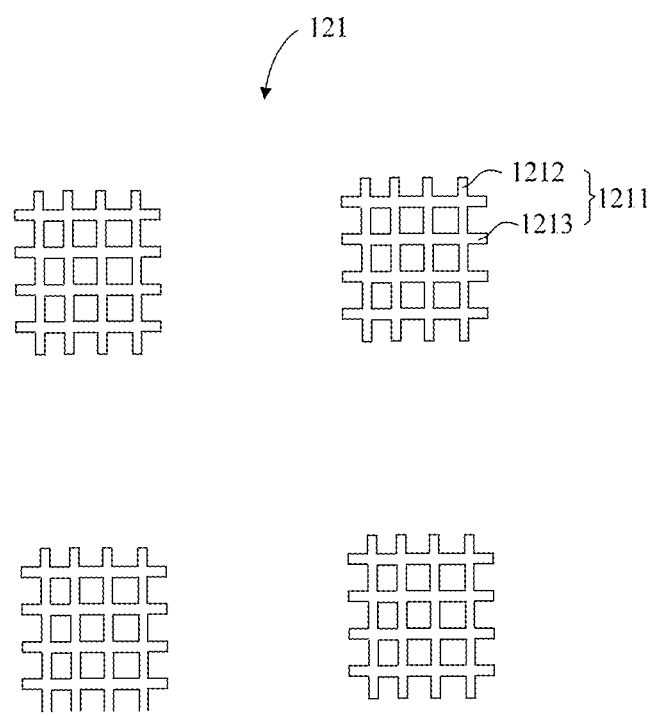
FIG. 28 is a schematic structural view of a first radio-wave transparent layer of a radio-wave transparent structure provided in an eighth implementation of the present disclosure.

FIG. 28 is a schematic structural view of the first radio-wave transparent layer of the radio-wave transparent structure provided in an eighth implementation of the present disclosure. The radio-wave transparent structure 120 in this implementation includes multiple first patches 1211 arranged in an array, and each first patch 1211 is a metal mesh-grid patch in a square shape. In an implementation, the first patch 1211 includes multiple first branches 1212 and multiple second branches 1213. The multiple first branches 1212 are spaced apart from each other, the multiple second branches 1213 are spaced apart from each other, and the multiple second branches 1213 and the multiple first branches 1212 are intersected and connected. In an implementation, the multiple first branches 1212 may extend along a first direction and be spaced apart from one another along a second direction. In an implementation, the multiple second branches 1213 may intersect and be perpendicular to the multiple first branches 1212. In an implementation, each first branch 1212 may have a side length falling within a range from 0.5 mm to 0.8 mm.

Figure 29:
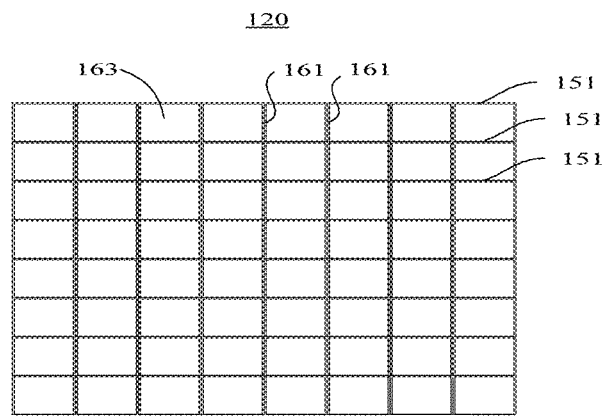
FIG. 29 is a schematic structural view of a radio-wave transparent structure provided in a ninth implementation of the present disclosure.

FIG. 29 is a schematic structural view of a radio-wave transparent structure provided in a ninth implementation of the present disclosure. In this implementation, the radio-wave transparent structure 120 can include multiple conductive lines 151 arranged at intervals along a first direction and multiple conductive lines 161 arranged at intervals along a second direction. The conductive lines 151 arranged at intervals along the first direction and the conductive lines 161 arranged at intervals along the second direction may intersect to form multiple mesh-grid structures 163 arranged in an array. As an example, the radio-wave transparent structure 120 is a single layer structure. That is, the multiple mesh-grid structures together form a single layer structure. In other words, the multiple conductive lines 161 and the multiple conductive lines 151 are coplanar. When the radio-wave transparent structure 120 is a single one layer of metal structure, it is easy to process, low in cost, and can be realized in mass production. The radio-wave transparent structure 120 can include multiple mesh-grid structures 163 arranged in a period P (it is noted that, the period P may be equal to a width of the mesh-grid structure 163), each conductive line has a width W. As illustrated in FIG. 4, the dielectric substrate 110 has a thickness t1, the bearing film 130 has a thickness t2. By adjusting a value of the period P, a value of the width W, a value of the thickness t1, and a value of the thickness t2, the housing assembly 100 can have a minimized reflection coefficient S11 and a maximized transmission coefficient S21 to the RF signals in the preset frequency band.

In an example, two conductive lines 151 arranged at intervals along the first direction and two conductive lines 161 arranged at intervals along the second direction may intersect to form one mesh-grid structure 163. It is noted that, in an implementation, the first direction can be perpendicular to the second direction. In other implementations, the first direction may be not perpendicular to the second direction. In the multiple conductive lines 151 arranged at intervals along the first direction, a distance between each two adjacent conductive lines 151 may be the same or different from one another. Accordingly, in the multiple conductive lines 161 arranged at intervals along the second direction, a distance between each two adjacent conductive lines 161 may be the same or different from one another. The distance between each two adjacent conductive lines 151 may be the same as or different from the distance between each two adjacent conductive lines 161. Referring to FIG. 29, as a non-limiting implementation, the first direction is perpendicular to the second direction and the distance between each two adjacent conductive lines 151 is equal to the distance between each two adjacent conductive lines 161.

Further, as a width of the conductive line 151 or the conductive line 161 decreases, the preset frequency band shifts towards a low frequency and a bandwidth of the preset frequency band increases. As a side length or an inner diameter of the mesh-grid structure 163 increases, the preset frequency band shifts towards a low frequency and the bandwidth of the preset frequency band increases. As a thickness of the dielectric substrate 110 to be provided with the radio-wave transparent structure 120 increases, the preset frequency band shifts towards a low frequency and the bandwidth of the preset frequency band decreases.

Figure 30:
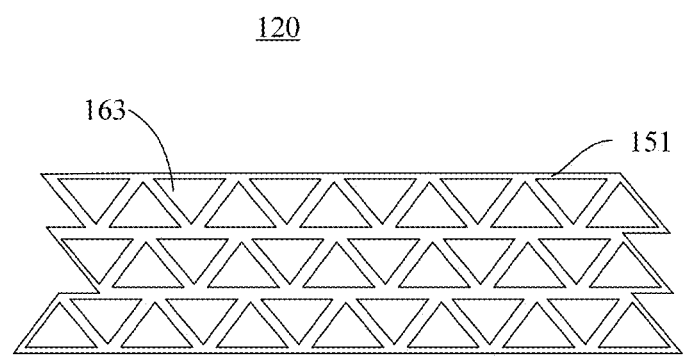
FIG. 30 is a schematic structural view of a radio-wave transparent structure provided in a tenth implementation of the present disclosure.

FIG. 30 is a schematic structural view of a radio-wave transparent structure provided in a tenth implementation of the present disclosure. The radio-wave transparent structure 120 can include multiple mesh-grid structures 163 arranged in an array. Each mesh-grid structure 163 can be defined by at least one conductive line 151. Two adjacent mesh-grid structures 163 can share at least part of the conductive line 151.

Specifically, the mesh-grid structure 163 may be in a shape of any of circle, rectangle, triangle, polygon, or ellipse, but is not limited thereto. When the mesh-grid structure 163 is in a shape of polygon, the number of sides of the mesh-grid structure 163 may be a positive integer greater than three. Referring to FIG. 30, as a non-limiting implementation, the mesh-grid structure 163 is in a shape of triangle.

In this implementation, as the width of the conductive line 151 or the conductive line 161 decreases, the preset frequency band shifts towards a low frequency and a bandwidth of the preset frequency band increases. As the side length or an inner diameter of the mesh-grid structure 163 increases, the preset frequency band shifts towards a low frequency and the bandwidth of the preset frequency band increases. As the thickness of the dielectric substrate 110 to be provided with the radio-wave transparent structure 120 increases, the preset frequency band shifts towards a low frequency and the bandwidth of the preset frequency band decreases.

When the mesh-grid structure 163 is in a shape of triangle, a period of the mesh-grid structure 163 is equal to the side length of the mesh-grid structure 163. When the grid structure 163 is in a shape of polygon, the period of the grid structure 163 is equal to the inner diameter of the mesh-grid structure 163.

Figure 31:
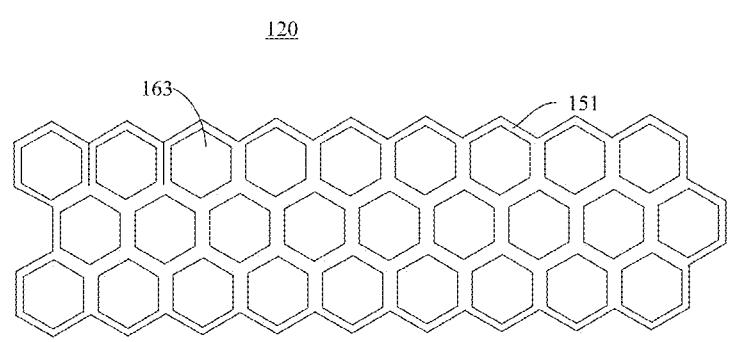
FIG. 31 is a schematic structural view of a radio-wave transparent structure provided in an eleventh implementation of the present disclosure.

FIG. 31 is a schematic structural view of a radio-wave transparent structure provided in an eleventh implementation of the present disclosure. Referring to FIG. 31, as a non-limiting implementation, the mesh-grid structure 163 is in a shape of regular hexagon. In this implementation, as the width of the conductive line 151 or the conductive line 161 decreases, the preset frequency band shifts towards a low frequency and a bandwidth of the preset frequency band increases. As the side length or an inner diameter of the mesh-grid structure 163 increases, the preset frequency band shifts towards a low frequency and the bandwidth of the preset frequency band increases. As the thickness of the dielectric substrate 110 to be provided with the radio-wave transparent structure 120 increases, the preset frequency band shifts towards a low frequency and the bandwidth of the preset frequency band decreases.

Figure 32:
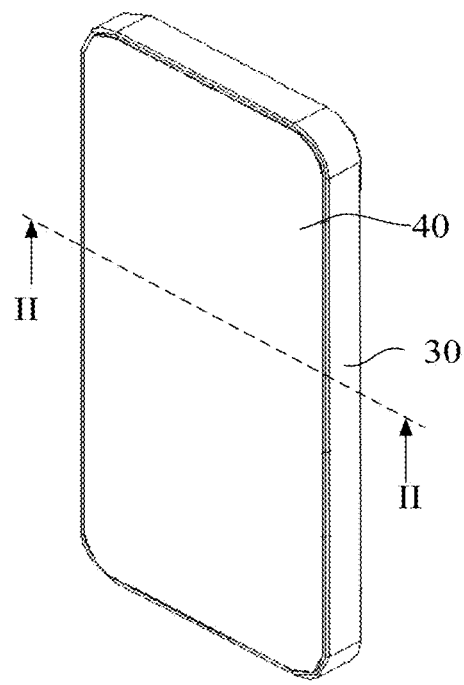
FIG. 32 is a schematic structural view of an electronic device provided in the second implementation.
Figure 33:
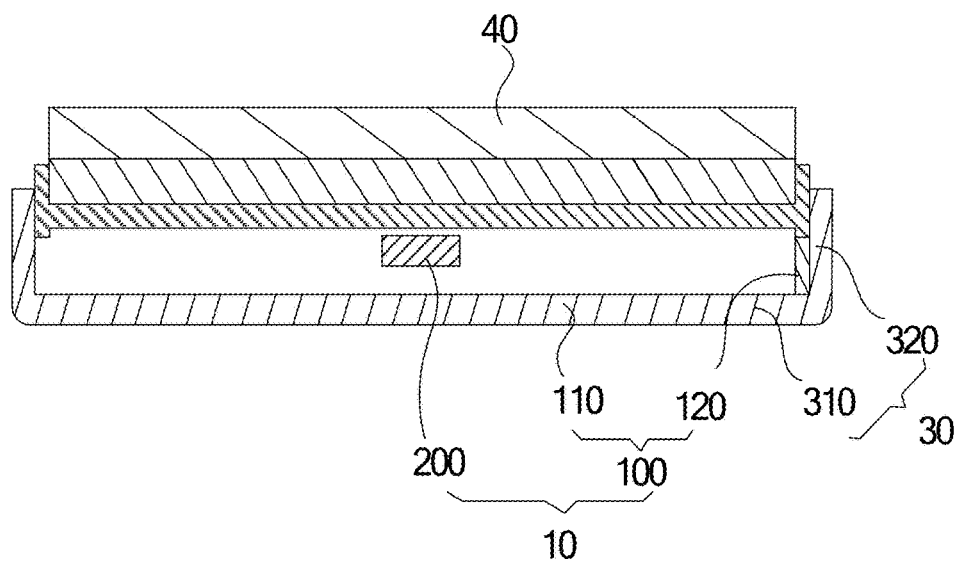
FIG. 33 is a schematic cross-sectional structural view of the electronic device illustrated in FIG. 32, along line II-II.

FIG. 32 is a schematic structural view of the electronic device provided in the second implementation of the present disclosure. FIG. 33 is a schematic cross-sectional structural view of the electronic device illustrated in FIG. 32, along line II-II. The electronic device 1 includes the antenna assembly 10. For the antenna assembly 10, reference can be made to the foregoing implementations, and details are not described herein again. The dielectric substrate 110 includes the battery cover 30 of the electronic device 1. The battery cover 30 of the electronic device 1 can include a rear plate 310 and a frame 320 bent and extended from a periphery of the rear plate 310. The radio-wave transparent structure 120 can be provided corresponding to the frame 320.

Figure 34:
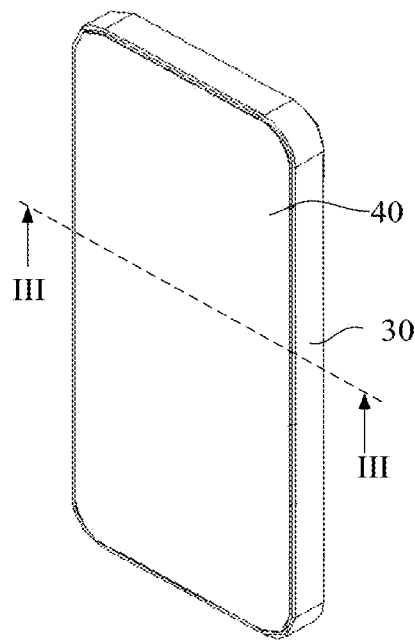
FIG. 34 is a schematic structural view of an electronic device provided in the third implementation of the present disclosure.
Figure 35:
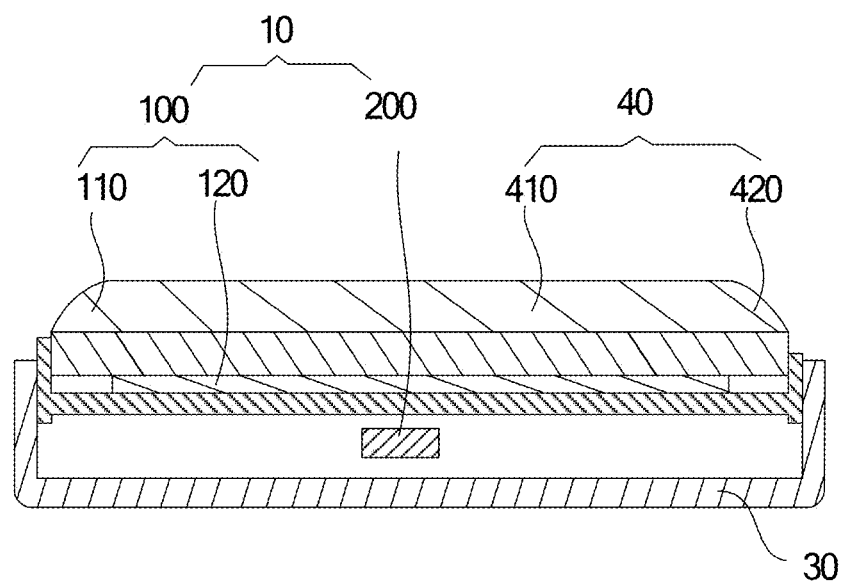
FIG. 35 is a schematic cross-sectional structural view of the electronic device illustrated in FIG. 34, along line III-III.

FIG. 34 is a schematic structural view of the electronic device provided in the third implementation of the present disclosure. FIG. 35 is a schematic cross-sectional structural view of the electronic device illustrated in FIG. 34, along line III-III. The electronic device 1 includes an antenna assembly 10. For the antenna assembly 10, reference can be made to the foregoing implementations, and details are not described herein again. The dielectric substrate 110 includes a screen 40 of the electronic device 1.

Further, when the dielectric substrate 110 includes the screen 40 of the electronic device 1, the screen 40 can include a screen body 410 and an extending portion 420 bent and extended from a periphery of the screen body 410. The radio-wave transparent structure 120 can be disposed corresponding to the screen body 410.

Figure 36:
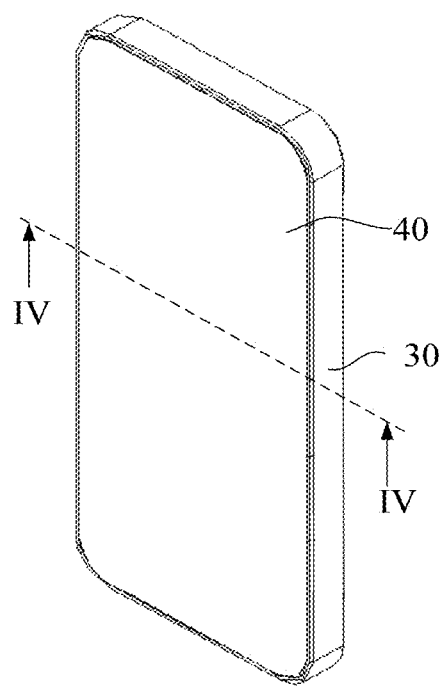
FIG. 36 is a schematic structural view of an electronic device provided in the fourth implementation of the present disclosure.
Figure 37:
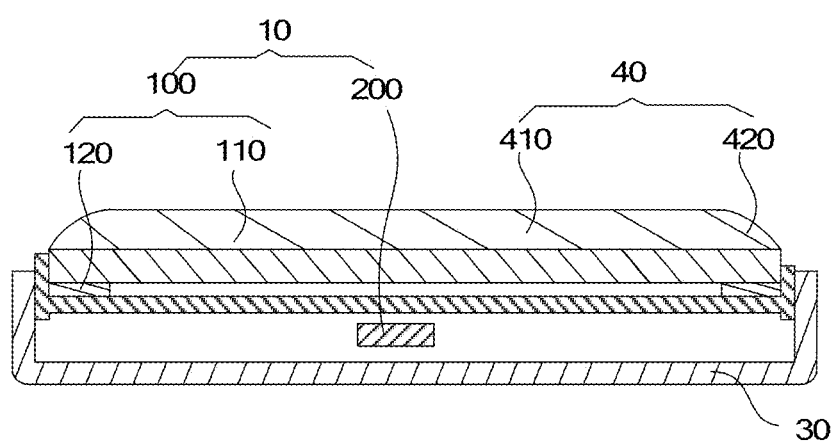
FIG. 37 is a schematic cross-sectional structural view of the electronic device illustrated in FIG. 36, along line IV-IV.

FIG. 36 is a schematic structural view of the electronic device provided in the fourth implementation of the present disclosure. FIG. 37 is a schematic cross-sectional structural view of the electronic device illustrated in FIG. 36, along line IV-IV. The electronic device 1 includes an antenna assembly 10. For the antenna assembly 10, reference can be made to the foregoing implementations, and details are not described herein again. The dielectric substrate 110 includes a screen 40 of the electronic device 1. The screen 40 can include a screen body 410 and an extending portion 420 bent and extended from a periphery of the screen body 410. The radio-wave transparent structure 120 can be disposed corresponding to the extending portion 420.

Figure 38:
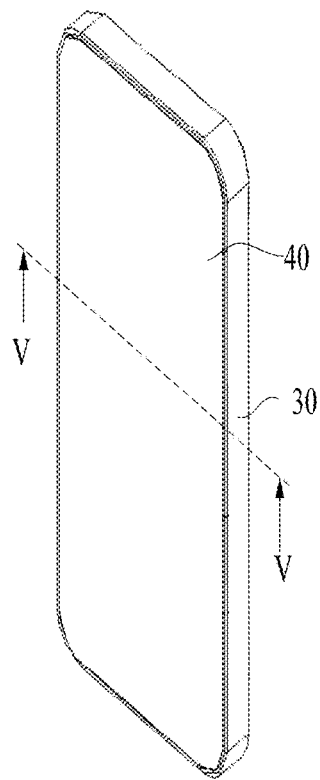
FIG. 38 is a schematic structural view of an electronic device provided in the fifth implementation of the present disclosure.
Figure 39:
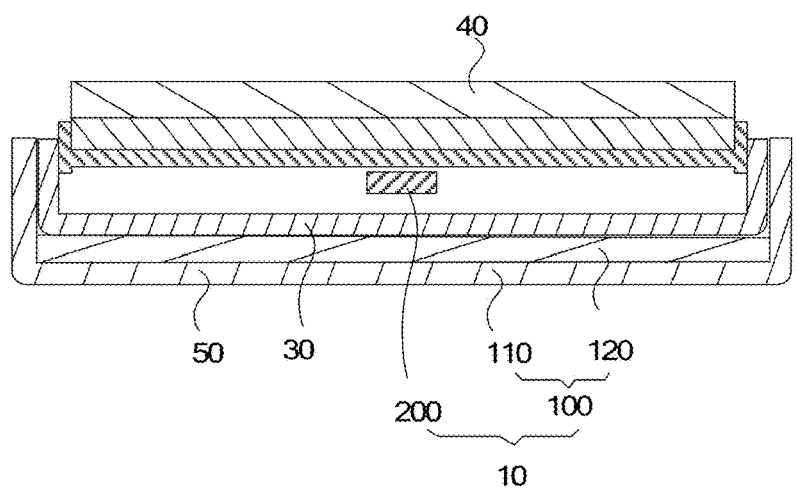
FIG. 39 is a schematic cross-sectional structural view of the electronic device illustrated in FIG. 38, along line V-V.

FIG. 38 is a schematic structural view of the electronic device provided in the fifth implementation of the present disclosure. FIG. 39 is a schematic cross-sectional structural view of the electronic device illustrated in FIG. 38, along line V-V. The electronic device 1 includes the antenna assembly 10. For the antenna assembly 10, reference can be made to the foregoing implementations, and details are not described herein again. The electronic device 1 can include a battery cover 30 and a protective cover 50. The protective cover 50 covers a surface of the battery cover 30 to protect the battery cover 30. The dielectric substrate 110 can include the protective cover 50. The radio-wave transparent structure 120 can be disposed corresponding to the protective cover 50.

Figure 40:
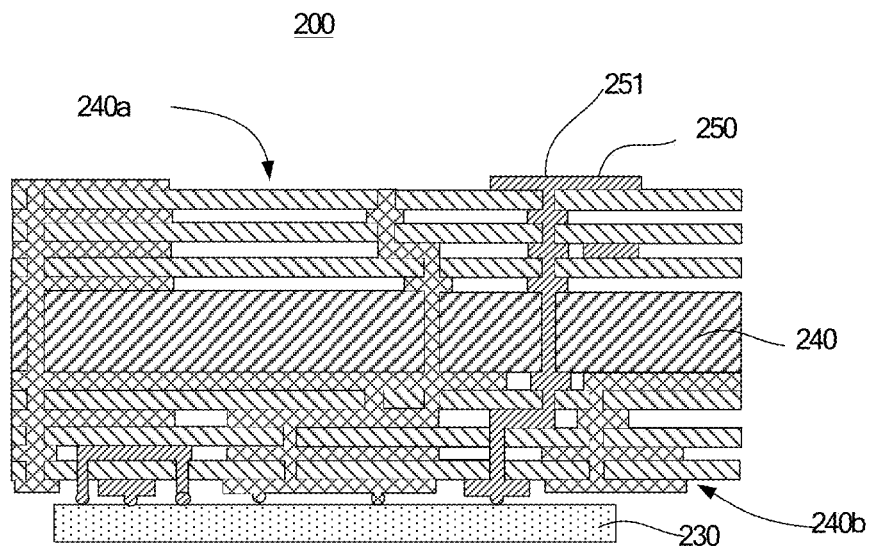
FIG. 40 is a schematic cross-sectional structural view of an antenna module provided in an implementation of the present disclosure.

FIG. 40 is a schematic cross-sectional structural view of the antenna module provided in an implementation of the present disclosure. The antenna module 200 can include an RF chip 230, an insulating substrate 240, and at least one first antenna radiator 250. The RF chip 230 is configured to generate an excitation signal (also referred to as an RF signal). The RF chip 230 is further away from the radio-wave transparent structure 120 than the at least one first antenna radiator 250. The insulating substrate 240 is configured to carry the at least one first antenna radiator 250.

The RF chip 230 is electrically coupled with the at least one first antenna radiator 250 via transmission lines embedded in the insulating substrate 240. In an implementation, the insulating substrate 240 includes a third surface 240a and a fourth surface 240b opposite to the third surface 240a. In an implementation, the at least one first antenna radiator 250 is disposed on the third surface 240a. Alternatively, the at least one first antenna radiator 250 is embedded in the insulating substrate 240. Referring to FIG. 40, as a non-limiting implementation, the at least one first antenna radiator 250 is disposed on the third surface 240a and the RF chip 230 is disposed on the fourth surface 240b. The excitation signal generated by the RF chip 230 is transmitted to the at least one first antenna radiator 250 via the transmission lines embedded in the insulating substrate 240. The RF chip 230 may be soldered on the insulating substrate 240 such that the excitation signal is transmitted to the first antenna radiator 250 via the transmission lines embedded in the insulating substrate 240. The first antenna radiator 250 receives the excitation signal and generates a millimeter wave signal according to the excitation signal. Each first antenna radiator 250 may be, but is not limited to, a patch antenna.

Further, the RF chip 230 is further away from the radio-wave transparent structure 120 than the at least one first antenna radiator 250. An output terminal of the RF chip 230 used to output the excitation signal is disposed at a side of the insulating substrate 240 away from the radio-wave transparent structure 120. That is, the RF chip 230 is disposed close to the fourth surface 240b of the insulating substrate 240 and away from the third surface 240a of the insulating substrate 240.

Further, each first antenna radiator 250 includes at least one feeding point 251. Each feeding point 251 is electrically coupled with the RF chip 230 via the transmission lines. A distance between each feeding point 251 and a center of the first antenna radiator 250 corresponding to the feeding point 251 is greater than a preset distance. An adjustment of a position of the feeding point 251 can change an input impedance of the first antenna radiator 250. In this implementation, by setting the distance between each feeding point 251 and the center of the first antenna radiator 250 corresponding to the feeding point 251 to be greater than the preset distance, the input impedance of the first antenna radiator 250 may be adjusted. The input impedance of the first antenna radiator 250 is adjusted to enable the input impedance of the first antenna radiator 250 to match an output impedance of the RF chip 230. When the input impedance of the first antenna radiator 250 matches the output impedance of the RF chip 230, a reflection amount of the excitation signal generated by the RF signal is minimal.

Figure 41:
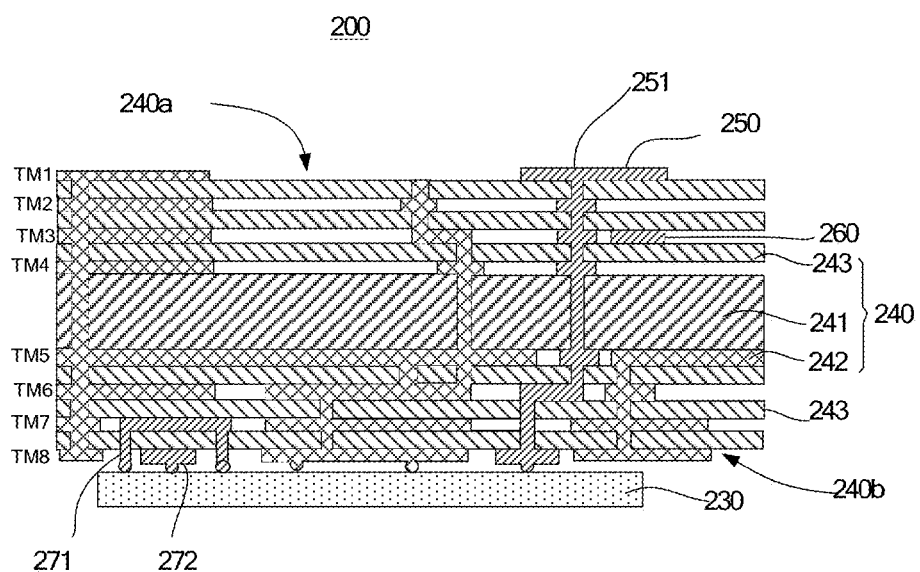
FIG. 41 is a schematic cross-sectional structural view of an antenna module provided in another implementation of the present disclosure.

FIG. 41 is a schematic cross-sectional view of the antenna module provided in another implementation of the present disclosure. The antenna module 200 provided in this implementation is substantially identical to the antenna module 200 provided in the first implementation except the following. The antenna module 200 in this implementation further includes at least one second antenna radiator 260. That is, in this implementation, the antenna module 200 can include the RF chip 230, the insulating substrate 240, the at least one first antenna radiator 250, and the at least one second antenna radiator 260. The RF chip 230 is configured to generate an excitation signal. The insulating substrate 240 includes the third surface 240a and the fourth surface 240b opposite to the third surface 240a. The at least one first antenna radiator 250 is disposed on the third surface 240a, and the RF chip 230 is disposed on the fourth surface 240b. The excitation signal generated by the RF chip 230 is transmitted to the at least one first antenna radiator 250 via the transmission lines embedded in the insulating substrate 240. The RF chip 230 can be soldered on the insulating substrate 240 such that the excitation signal is transmitted to the first antenna radiator 250 via the transmission lines embedded in the insulating substrate 240. The first antenna radiator 250 receives the excitation signal and generates a millimeter wave signal according to the excitation signal.

Further, the RF chip 230 is further away from the radio-wave transparent structure 120 than the first antenna radiator 250. The output terminal of the RF chip 230 used to output the excitation signal is disposed at the side of the insulating substrate 240 away from the radio-wave transparent structure 120.

Further, each first antenna radiator 250 includes at least one feeding point 251. Each feeding point 251 is electrically coupled with the RF chip 230 via the transmission lines. A distance between each feeding point 251 and the center of the first antenna radiator 250 corresponding to the feeding point 251 is smaller than the preset distance.

In this implementation, the second antenna radiator 260 is embedded in the insulating substrate 240. The second antenna radiator 260 is spaced apart from the first antenna radiator 250, and the second antenna radiator 260 is coupled with the first antenna radiator 250 to form a stacked patch antenna. When the second antenna radiator 260 is coupled with the first antenna radiator 250 to form the stacked patch antenna, the first antenna radiator 250 is electrically connected with the RF chip 230, while the second antenna radiator 260 is not electrically connected with the RF chip 230. The second antenna radiator 260 couples with the millimeter wave signal radiated by the first antenna radiator 250, and generates a new millimeter wave signal according to the millimeter wave signal radiated by the first antenna radiator 250 coupled with the second antenna radiator 260.

Further, an example that the antenna module 200 is manufactured through HDI process is given below for illustration. The insulating substrate 240 includes a core layer 241 and multiple wiring layers 242 stacked on opposite sides of the core layer 241. The core layer 241 is an insulating layer, and an insulating layer 243 is generally sandwiched between each two adjacent wiring layers 242. The wiring layer 242 disposed at a side of the core layer 241 close to the radio-wave transparent structure 120 and furthest away from the core layer 241 has an outer surface forming at least part of the third surface 240a of the insulating substrate 240. The wiring layer 242 disposed at a side of the core layer 241 away from the radio-wave transparent structure 120 and furthest away from the core layer 241 has an outer surface forming the fourth surface 240b of the insulating substrate 240. The first antenna radiator 250 is disposed on the third surface 240a. The second antenna radiator 260 is embedded in the insulating substrate 240. That is, the second antenna radiator 260 can be disposed on other wiring layers 122 which are used for arranging antenna radiators, and the second antenna radiator 260 is not disposed on a surface of the insulating substrate 240.

In this implementation, an example that the insulating substrate 240 is of an eight-layer structure is given below for illustration. It is noted that, in other implementations, other number of layers of the insulating substrate 240 may be adopted. The insulating substrate 240 includes the core layer 241, a first wiring layer TM1, a second wiring layer TM2, a third wiring layer TM3, a fourth wiring layer TM4, a fifth wiring layer TM5, a sixth wiring layer TM6, a seventh wiring layer TM7, and an eighth wiring layer TM8. The first wiring layer TM1, the second wiring layer TM2, the third wiring layer TM3, and the fourth wiring layer TM4 are indirectly stacked on a surface of the core layer 241. Alternatively, the first wiring layer TM1, the second wiring layer TM2, the third wiring layer TM3, and the fourth wiring layer TM4 are indirectly stacked together, and the fourth wiring layer TM4 is disposed on a surface of the core layer 241 away from the radio frequency chip 230. The first wiring layer TM1 is disposed further away from the core layer 241 than the fourth wiring layer TM4. A surface of the first wiring layer TM1 away from the core layer 241 forms at least a part of the third surface 240a of the insulating substrate 240. The fifth wiring layer TM5, the sixth wiring layer TM6, the seventh wiring layer TM7, and the eighth wiring layer TM8 are indirectly stacked together on another same surface of the core layer 241. Alternatively, the fifth wiring layer TM5, the sixth wiring layer TM6, the seventh wiring layer TM7, and the eighth wiring layer TM8 are indirectly stacked together, and the fifth wiring layer TM5 is disposed on a surface of the core layer 241 close to the radio frequency chip 230. The eighth wiring layer TM8 is disposed further away from the core layer 241 than the fifth wiring layer TM5. A surface of the eighth wiring layer TM8 away from the core layer 241 is the fourth surface 240b of the insulating substrate 240. Normally, the first wiring layer TM1, the second wiring layer TM2, the third wiring layer TM3, and the fourth wiring layer TM4 form wiring layers 122 that can be provided with the antenna radiators. The fifth wiring layer TM5 is a ground layer on which a ground electrode is provided. The sixth wiring layer TM6, the seventh wiring layer TM7, and the eighth wiring layer TM8 form wiring layers in which a feeding network and control lines of the antenna module 200 are provided. In another implementation, the sixth wiring layer TM6 and the seventh wiring layer TM7 form wiring layers on which the feeding network and the control lines of the antenna module 200 are provided. The radio frequency chip 230 is soldered on the eighth wiring layer TM8. In this implementation, the first antenna radiator 250 is disposed on the surface of the first wiring layer TM1 away from the core layer 241 (alternatively, the at least one first antenna radiator 250 may be disposed on the third surface 240a), and the second antenna radiator 260 may be disposed in the third wiring layer TM3. As an example illustrated in FIG. 41, the first antenna radiator 250 may be disposed on the surface of the first wiring layer TM1 and the second antenna radiator 260 is disposed in the third wiring layer TM3. It is noted that, in other implementations, the first antenna radiator 250 may be disposed on the surface of the first wiring layer TM1 away from the core layer 241, and the second antenna radiator 260 may be disposed in the second wiring layer TM2 or the fourth wiring layer TM4.

Further, the first wiring layer TM1, the second wiring layer TM2, the third wiring layer 242, the third wiring layer TM3, the fourth wiring layer TM4, the sixth wiring layer TM6, the seventh wiring layer TM7, and the eighth wiring layer TM8 in the insulating substrate 240 are all electrically connected to the ground layer in the fifth wiring layer TM5. In an implementation, the first wiring layer TM1, the second wiring layer TM2, the third wiring layer TM3, the fourth wiring layer TM4, the sixth wiring layer TM6, the seventh wiring layer TM7, and the eighth wiring layer TM8 in the insulating substrate 240 all define through holes, and each through hole is filled with a metal material electrically coupled with the ground layer, such that components in each wiring layer 242 are grounded.

Further, the seventh wiring layer TM7 and the eighth wiring layer TM8 are further provided with power lines 271 and control lines 272. The power lines 271 and the control lines 272 are electrically coupled with the RF chip 230 respectively. The power lines 271 are used to provide the RF chip 230 with required power, and the control lines 272 are used to transmit control signals to the RF chip 230 to control the operation of the RF chip 230.

Figure 42:
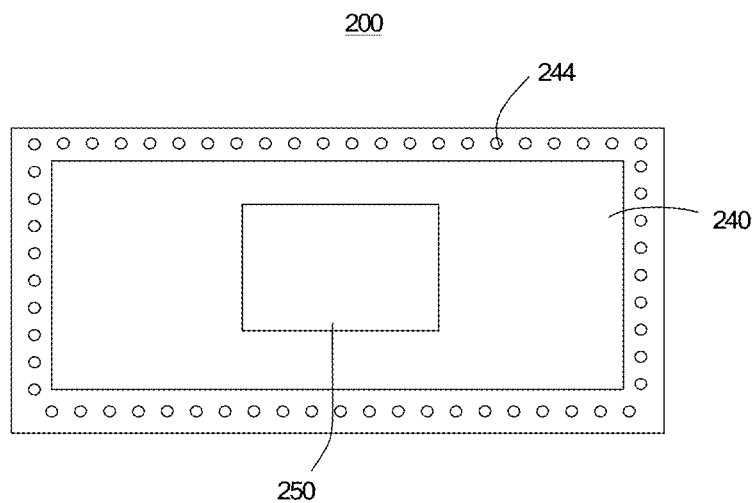
FIG. 42 is a schematic view of an antenna module provided in an implementation of the present disclosure.
Figure 43:
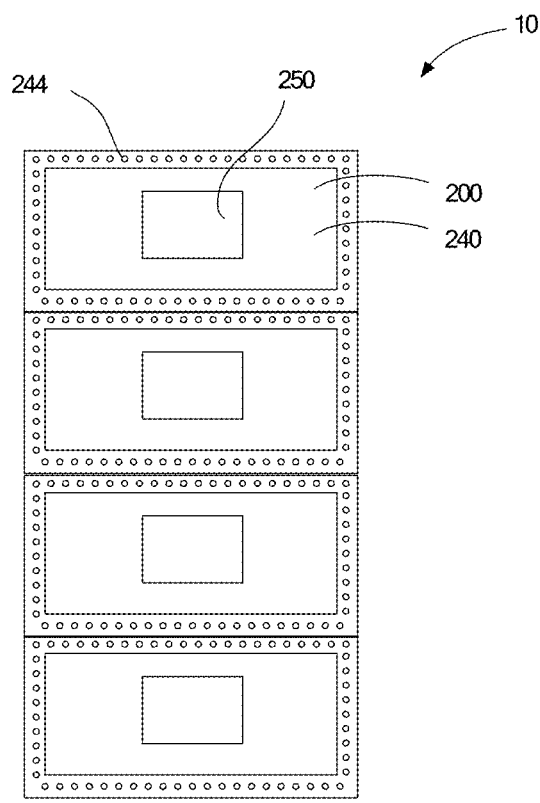
FIG. 43 is a schematic structural view of an RF antenna array constructed with M×N packaged antenna modules provided in an implementation of the present disclosure.

FIG. 42 is a schematic view of an antenna assembly 10 according to an implementation of the present disclosure. FIG. 43 is a schematic structural view of a RF antenna array constructed with M×N packaged antenna assemblies 10 according to an implementation of the present disclosure. The electronic device 1 includes the RF antenna array with M×N antenna assemblies 10, where M is a positive integer and N is a positive integer. As illustrated in FIG. 43, the RF antenna array includes 4×1 antenna assemblies 10. For each antenna module 200 in the antenna assembly 10, the insulating substrate 240 further defines multiple metallized via grids 244 arranged around each first antenna radiator 250 to improve isolation between each two adjacent first antenna radiators 250. When the metalized via grids 244 are defined in multiple antenna modules 200 to achieve a radiation frequency antenna array, the metalized via grids 244 are used to improve the isolation between each two adjacent antenna modules 200, so as to reduce or even avoid the interference of millimeter wave signals generated by each antenna module 200.

As a non-limiting implementation, the antenna module 200 includes a patch antenna or a stacked antenna in the foregoing. It is noted that the antenna module 200 may further include a dipole antenna, a magnetic electric dipole antenna, a quasi-Yagi antenna, and the like. The antenna assembly 10 may include a combination consisting of at least one or more of a patch antenna, a stacked antenna, a dipole antenna, a magnetic dipole antenna, or a quasi-Yagi antenna. Further, the dielectric substrates 110 of the M×N antenna assemblies 10 may be connected to each other into an integrated structure.

Figure 44:
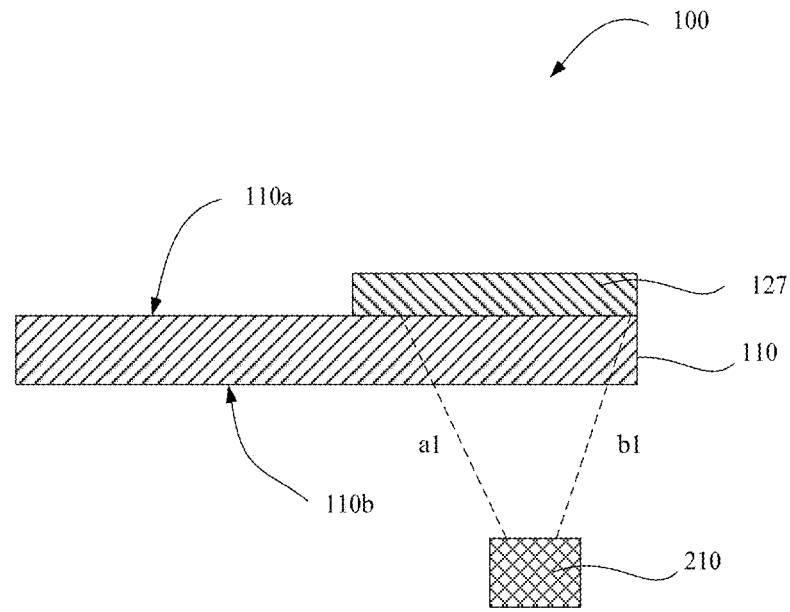
FIG. 44 is a schematic structural view of an electronic device provided in the sixth implementation of the present disclosure.

FIG. 44 is a schematic structural view of the electronic device provided in the sixth implementation of the present disclosure. The electronic device 1 includes a first antenna module 210, a dielectric substrate 110, and a first radio-wave transparent structure 127. The first antenna module 210 is configured to emit and receive, within a first preset direction range, a first RF signal in a first frequency band. The dielectric substrate 110 is spaced apart from the first antenna module 210, and at least part of the dielectric substrate 110 is within the first preset direction range. A part of the dielectric substrate 110 within the first preset direction range has a first equivalent wave impedance to the first RF signal in the first frequency band. The first equivalent wave impedance differs from the wave impedance in the free space by the first difference. The first radio-wave transparent structure 127 is carried on the dielectric substrate 110, and the first radio-wave transparent structure 127 is at least partially within the first preset direction range. The electronic device 1 has a second equivalent wave impedance to the first RF signal in the first frequency band in a region corresponding to the first radio-wave transparent structure 127. The second wave impedance differs from the wave impedance in the free space by the second difference. The second difference is less than the first difference. As illustrated in FIG. 44, the first preset direction range is defined by a dashed line a1 and a dashed line b2.

Figure 45:
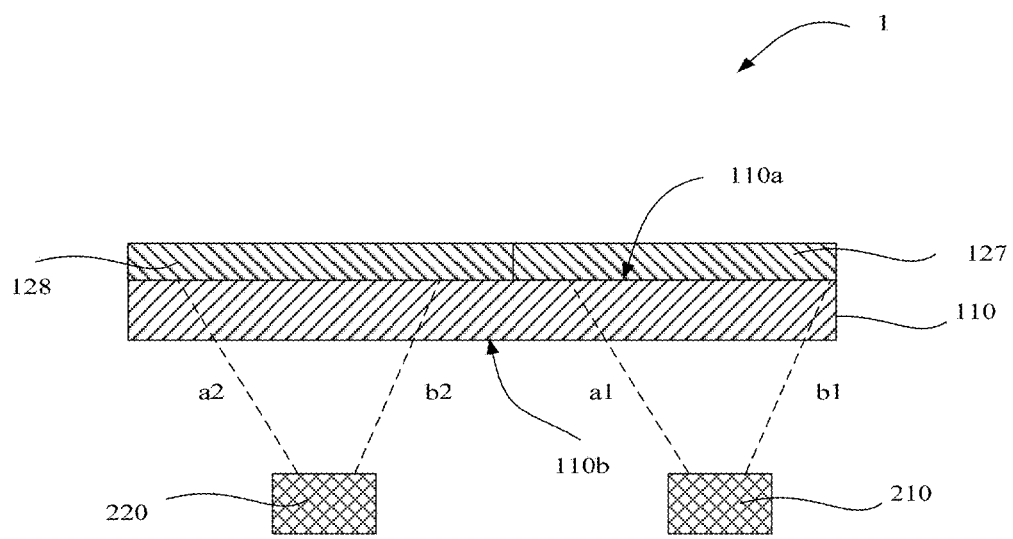
FIG. 45 is a schematic structural view of an electronic device provided in the seventh implementation of the present disclosure.

FIG. 45 is a schematic structural view of the electronic device provided in the seventh implementation of the present disclosure. The electronic device 1 may further include a second antenna module 220 and a second radio-wave transparent structure 128. The second antenna module 220 is spaced apart from the first antenna module 210 and the second antenna module 220 is disposed outside the first preset direction range. The second antenna module 220 is configured to emit and receive, within a second preset direction range, a second RF signal in a second frequency band. The dielectric substrate 110 is also spaced apart from the second antenna module 220. At least part of the dielectric substrate 110 is within the second preset direction range, and a part of the dielectric substrate 110 within the second preset direction range has a third transmittance to the second RF signal in the second frequency band. The second radio-wave transparent structure 128 is carried on the dielectric substrate 110, and at least part of the second radio-wave transparent structure 128 is within the second preset direction range. The electronic device 1 has a fourth transmittance to the second RF signal in the second frequency band in a region corresponding to the second radio-wave transparent structure 128, wherein the fourth transmittance is greater than the third transmittance. As illustrated in FIG. 45, the first preset direction range is defined by a dashed line a1 and a dashed line b1, and the second preset direction range is defined by a dashed line a2 and a dashed line b2.

Figure 46:
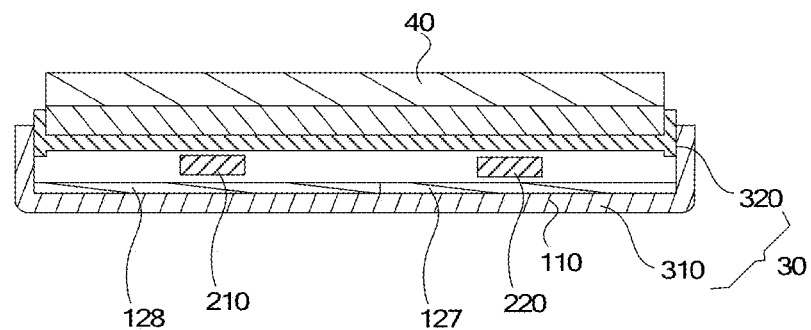
FIG. 46 is a schematic structural view of an electronic device provided in the eighth implementation of the present disclosure.

FIG. 46 is a schematic structural view of the electronic device provided in the eighth implementation of the present disclosure. When the dielectric substrate 110 includes a battery cover 30 of the electronic device 1, the battery cover 30 of the electronic device 1 can include a rear plate 310 and a frame 320 bent and extended from a periphery of the rear plate 310. The first antenna module 210 and the second antenna module 220 are both disposed corresponding to the rear plate 310, that is, the rear plate 310 is at least partially within the first preset direction range and at least partially within the second preset direction range. The first antenna module 210 being disposed corresponding to the rear plate 310 means that the rear plate 310 is at least partially disposed within a range where the first antenna module 210 can emit or receive RF signals. The second antenna module 220 being disposed corresponding to the rear plate 310 means that the rear plate 310 is at least partially disposed within a range where the second antenna module 220 can emit or receive RF signals. Correspondingly, the first radio-wave transparent structure 127 and the second radio-wave transparent structure 128 are both disposed corresponding to the rear plate 310.

Figure 47:
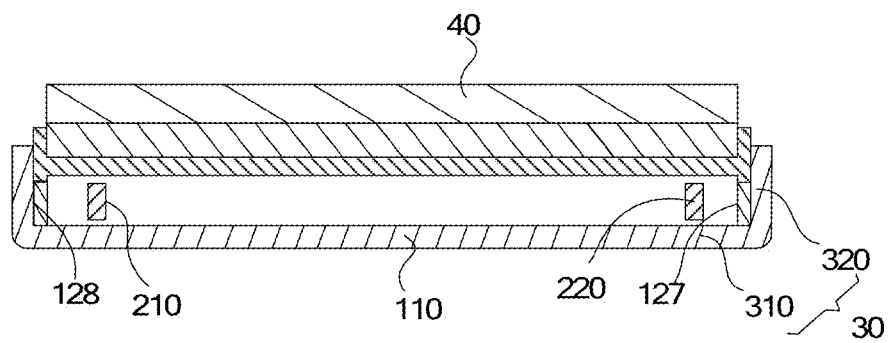
FIG. 47 is a schematic structural view of an electronic device provided in the ninth implementation of the present disclosure.

FIG. 47 is a schematic structural view of the electronic device provided in a ninth implementation of the present disclosure. The electronic device 1 provided in the ninth implementation is substantially identical to the electronic device 1 provided in the eighth implementation of the present disclosure except the following. The first antenna module 210 and the second antenna module 220 in the ninth implementation are both disposed corresponding to the frame 320, that is, the frame 320 is at least partially within the first preset direction range and at least partially within the second preset direction range. The first antenna module 210 being disposed corresponding to the frame 320 means that the frame 320 is at least partially disposed within a range where the first antenna module 210 can emit or receive RF signals. The second antenna module 220 being disposed corresponding to the frame 320 means that the frame 320 is at least partially disposed within a range where the second antenna module 220 can emit or receive RF signals. Accordingly, the first radio-wave transparent structure 127 and the second radio-wave transparent structure 128 are both disposed corresponding to the frame 320. As illustrated in FIG. 47, an example that the first radio-wave transparent structure 127 and the second radio-wave transparent structure 128 are oppositely disposed is taken for illustration.

Figure 48:
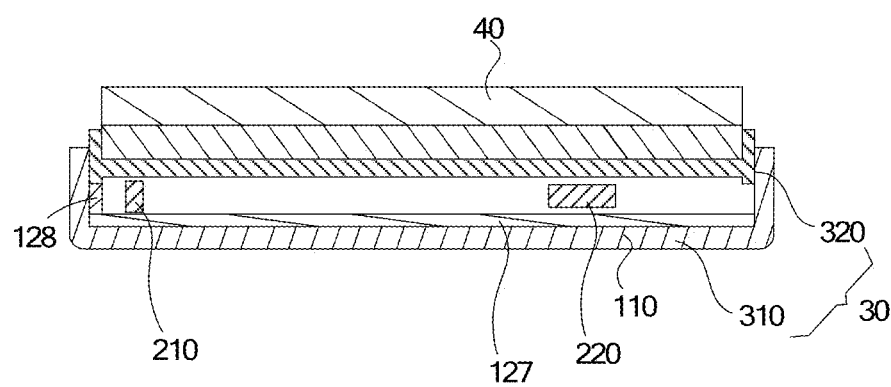
FIG. 48 is a schematic structural view of an electronic device provided in the tenth implementation of the present disclosure.

FIG. 48 is a schematic structural view of the electronic device provided in a tenth implementation of the present disclosure. The electronic device 1 provided in the tenth implementation is substantially identical to the electronic device 1 provided in the eighth implementation of the present disclosure except the following. The first antenna module 210 in the tenth implementation is disposed corresponding to the rear plate 310 and the second antenna module 220 in the tenth implementation is disposed corresponding to the frame 320, that is, the rear plate 310 is at least partially within the first preset direction range and the frame 320 is at least partially within the second preset direction range. The first antenna module 210 being disposed corresponding to the rear plate 310 means that the rear plate 310 is at least partially disposed within a range where the first antenna module 210 can emit or receive RF signals. The second antenna module 220 being disposed corresponding to the frame 320 means that the frame 320 is at least partially disposed within a range where the second antenna module 220 can emit or receive RF signals. Accordingly, the first radio-wave transparent structure 127 is disposed corresponding to the rear plate 310, and the second radio-wave transparent structure 128 is disposed corresponding to the frame 320. In another implementation, the first antenna module 210 in this implementation is disposed corresponding to the frame 320 and the second antenna module 220 in this implementation is disposed corresponding to the rear plate 310, that is, the frame 320 is at least partially within the first preset direction range and the rear plate 310 is at least partially within the second preset direction range.

Figure 49:
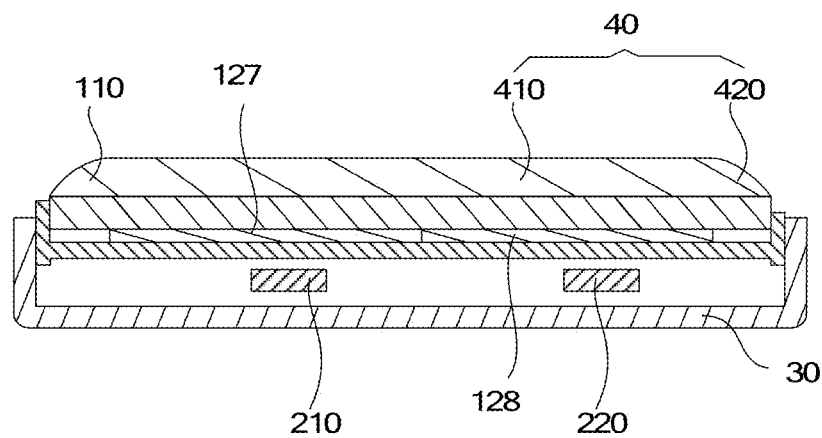
FIG. 49 is a schematic structural view of an electronic device provided in the eleventh implementation of the present disclosure.

FIG. 49 is a schematic structural view of an electronic device provided in an eleventh implementation of the present disclosure. When the dielectric substrate 110 includes a screen 40 of the electronic device 1, the screen 40 includes a screen body 410 and an extending portion 420 bent and extended from a periphery of the screen body 410. The first antenna module 210 and the second antenna module 220 are both disposed corresponding to the screen body 410, that is, the screen body 410 is at least partially within the first preset direction range and at least partially within the second preset direction range. Accordingly, the first radio-wave transparent structure 127 and the second radio-wave transparent structure 128 are both disposed corresponding to the screen body 410.

Figure 50:
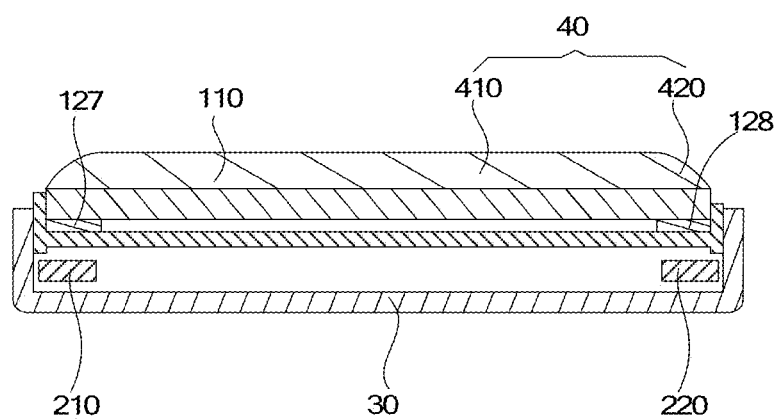
FIG. 50 is a schematic structural view of an electronic device provided in the twelfth implementation of the present disclosure.

FIG. 50 is a schematic structural view of the electronic device provided in a twelfth implementation of the present disclosure. The first antenna module 210 and the second antenna module 220 are both disposed corresponding to the extending portion 420, that is, the extending portion 420 is at least partially within the first preset direction range and at least partially within the second preset direction range. Accordingly, the first radio-wave transparent structure 127 and the second radio-wave transparent structure 128 are both disposed corresponding to the extending portion 420.

Figure 51:
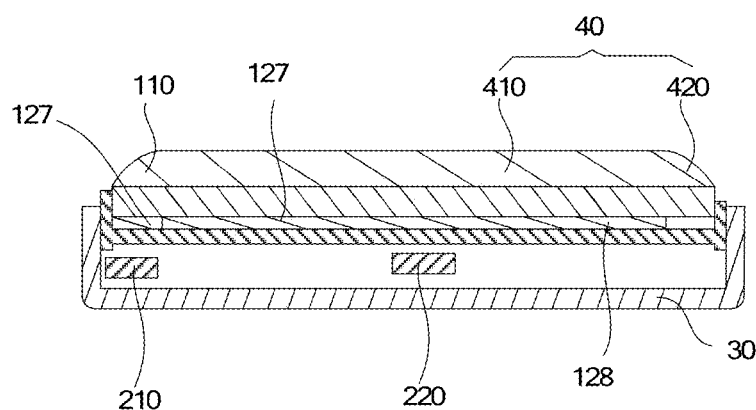
FIG. 51 is a schematic structural view of an electronic device provided in the thirteenth implementation of the present disclosure.

FIG. 51 is a schematic structural view of the electronic device provided in a thirteenth implementation of the present disclosure. The first antenna module 210 is disposed corresponding to the screen body 410, and the second antenna module 220 is disposed corresponding to the extending portion 420, that is, the screen body 410 is at least partially within the first preset direction range and the extending portion 420 is at least partially within the second preset direction range. Accordingly, the first radio-wave transparent structure 127 is disposed corresponding to the screen body 410, and the second radio-wave transparent structure 128 is disposed corresponding to the extending portion 420.

Figure 52:
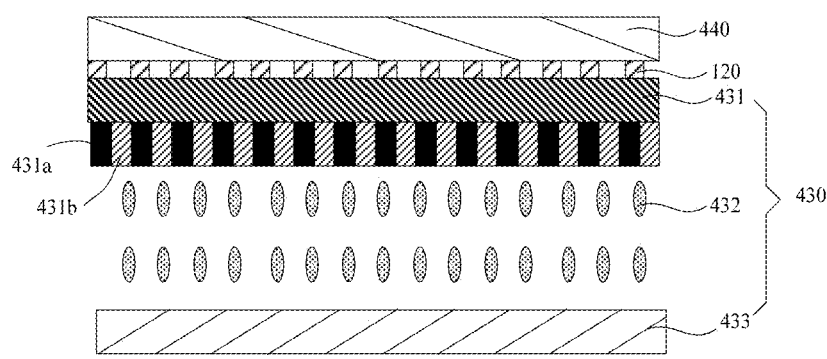
FIG. 52 is a schematic structural view of a screen of an electronic device provided in a fourteenth implementation of the present disclosure.

FIG. 52 is a schematic structural view of a screen of an electronic device provided in a fourteenth implementation of the present disclosure. In this implementation, the dielectric substrate 110 includes a screen 40 of the electronic device 1. The screen 40 includes a display panel 430 and a cover plate 440 stacked with each other. The radio-wave transparent structure 120 is disposed on the cover plate 440.

The screen 40 may refer to a component that performs a display function in the electronic device 1. The display panel 430 may be a liquid crystal display or an organic diode light-emitting display. The cover plate 440 is disposed on the display panel 430 for protecting the display panel 430. In this implementation, the radio-wave transparent structure 120 is disposed on the cover plate 440. The radio-wave transparent structure 120 is disposed on a surface of the cover plate 440 close to the display panel 430. Alternatively, the radio-wave transparent structure 120 can also be disposed on a surface of the cover plate 440 away from the display panel 430. Alternatively, the radio-wave transparent structure 120 is embedded in the cover plate 440. Because the cover plate 440 is an independent component, the difficulty of combining the radio-wave transparent structure 120 with the display body 110 can be reduced, when the radio-wave transparent structure 120 is disposed on the surface of the cover plate 440 close to the display panel 430 or disposed on the surface of the cover plate 440 away from the display panel 430. Referring to FIG. 52, as a non-limiting implementation, the radio-wave transparent structure 120 covers the entire region of the cover plate 440 and the radio-wave transparent structure 120 is directly disposed on the surface of the cover plate 440 close to the display panel 430.

In an implementation, the display panel 430 may include a color filter substrate 431, an array substrate 432, and a liquid crystal layer 433. The color filter substrate 431 and the array substrate 432 are arranged opposite to and spaced apart from one another. The liquid crystal layer 433 is sandwiched between the color filter substrate 431 and the array substrate 432.

In an implementation, the color filter substrate 431 may further include color resist units 431a arranged in a matrix. A black matrix 431b is disposed between adjacent color resist units 431a. The radio-wave transparent structure 120 is at least partially disposed corresponding to the black matrix 431b.

In this implementation, the radio-wave transparent structure 120 is at least partially disposed corresponding to the black matrix 431b, so as to reduce the influence of the arrangement of the radio-wave transparent structure 120 on a light transmittance of the display panel 430.

Although the implementations of the present disclosure have been illustrated and described above, it can be understood that the above implementations are illustrative and cannot be understood as limitations on the present disclosure. Those skilled in the art can make changes, modifications, replacements, and variations for the above implementations within the scope of the present disclosure, and these improvements and modifications are also considered to fall into the protection scope of the present disclosure.

What is claimed is:

1. A housing assembly comprising:
   a dielectric substrate having a first equivalent wave impedance to a radio frequency (RF) signal in a preset frequency band, the first equivalent wave impedance differing from a wave impedance of free space by a first difference; and
a radio-wave transparent structure carried on the dielectric substrate, wherein the radio-wave transparent structure covers at least a partial portion of the dielectric substrate;
wherein the housing assembly has a second equivalent wave impedance to the RF signal in the preset frequency band in a region corresponding to the radio-wave transparent structure, the second equivalent wave impedance differs from the wave impedance of the free space by a second difference, the second difference being less than the first difference;
wherein the radio-wave transparent structure on the dielectric substrate is capable of being excited by the RF signal in the preset frequency band, and the -radio-wave transparent structure generates an RF signal in the same frequency band as the preset frequency band according to the RF signal in the preset frequency band when the radio-wave transparent structure is excited by the RF signal in the preset frequency band, and the RF signal generated by the radio-wave transparent structure and the RF signal in the preset frequency band pass through the dielectric substrate and radiate into free space;
wherein the radio-wave transparent structure comprises a plurality of mesh-grid structures arranged in an array, each of the plurality of mesh-grid structures is defined by at least one conductive line, and two adjacent mesh-grid structures share at least part of the conductive line.

2. The housing assembly of claim 1, further comprising an adhesive layer, wherein the adhesive layer is sandwiched between the radio-wave transparent structure and the dielectric substrate to bond the radio-wave transparent structure to the dielectric substrate.

3. The housing assembly of claim 2, further comprising a bearing film configured to carry the radio-wave transparent structure, wherein the bearing film is disposed on one side of the radio-wave transparent structure away from the adhesive layer.

4. The housing assembly of claim 1, wherein the dielectric substrate comprises a first surface and a second surface opposite to the first surface, the first surface being more adjacent to the radio-wave transparent structure than the second surface, and wherein:
the radio-wave transparent structure is disposed on the first surface; or
the radio-wave transparent structure is disposed on the second surface; or
the radio-wave transparent structure is embedded in the dielectric substrate.

5. The housing assembly of claim 1, wherein,
the radio-wave transparent structure comprises a plurality of conductive lines arranged at intervals along a first direction and a plurality of conductive lines arranged at intervals along a second direction; and
the conductive lines arranged at intervals along the first direction and the conductive lines arranged at intervals along the second direction intersect to form a plurality of mesh-grid structures arranged in an array.

6. The housing assembly of claim 1, wherein the mesh-grid structure is in a shape of any of circle, rectangle, triangle, polygon, or ellipse.

7. The housing assembly of claim 5, wherein the first direction is perpendicular to the second direction.

8. The housing assembly of claim 5, wherein a distance between each two adjacent conductive lines arranged along the first direction is equal to a distance between each two adjacent conductive lines arranged along the second direction.

9. The housing assembly of claim 5, wherein the plurality of conductive lines arranged at intervals along the first direction and the plurality of conductive lines arranged at intervals along the second direction are coplanar.

10. An electronic device comprising an antenna assembly, wherein the antenna assembly comprises an antenna module and a housing assembly, wherein:
the antenna module is configured to emit and receive, within a preset direction range, a radio frequency (RF) signal in a preset frequency band;
the housing assembly comprises a dielectric substrate and a radio-wave transparent structure, wherein the dielectric substrate has a first equivalent wave impedance to the RF signal in the preset frequency band, the first equivalent wave impedance differs from a wave impedance of free space by a first difference, and the radio-wave transparent structure is carried on and at least partially covers the dielectric substrate;
the housing assembly has a second equivalent wave impedance to the RF signal in the preset frequency band in a region corresponding to the radio-wave transparent structure, the second equivalent wave impedance differs from the wave impedance of the free space by a second difference, and the second difference is less than the first difference;
the radio-wave transparent structure on the dielectric substrate is capable of being excited by the RF signal in the preset frequency band, and the radio-wave transparent structure generates an RF signal in the same frequency band as the preset frequency band according to the RF signal in the preset frequency band when the radio-wave transparent structure is excited by the RF signal in the preset frequency band, and the RF signal generated by the radio-wave transparent structure and the RF signal in the preset frequency band pass through the dielectric substrate and radiate into the free space;
the radio-wave transparent structure of the housing assembly is at least partially located within the preset direction range; and
the dielectric substrate comprises a battery cover or a screen of the electronic device;
wherein the radio-wave transparent structure comprises a plurality of mesh-grid structures arranged in an array, each of the plurality of mesh-grid structures is defined by at least one conductive line, and two adjacent mesh-grid structures share at least part of the conductive line.

11. The electronic device of claim 10, wherein:
the dielectric substrate comprises the battery cover of the electronic device, the battery cover of the electronic device comprises a rear plate and a frame bent and extended from a periphery of the rear plate; and
the radio-wave transparent structure is disposed corresponding to the rear plate or the frame.

12. The electronic device of claim 10, wherein:
the dielectric substrate comprises the screen of the electronic device, the screen comprises a screen body and an extending portion bent and extended from a periphery of the screen body; and
the radio-wave transparent structure is disposed corresponding to the screen body or the extending portion.

13. The electronic device of claim 10, wherein the dielectric substrate comprises the screen of the electronic device, the screen comprises a display panel and a cover plate stacked with the display panel, and the radio-wave transparent structure is disposed on the cover plate.

14. The electronic device of claim 13, wherein the radio-wave transparent structure is disposed on a surface of the cover plate facing the display panel.

15. The electronic device of claim 14, wherein:
the display panel comprises a color filter substrate, and the color filter substrate is provided with color resist units arranged in a matrix;
a black matrix is disposed between adjacent color resist units; and
the radio-wave transparent structure is at least partially disposed corresponding to the black matrix.

16. An electronic device comprising:
a first antenna module configured to emit and receive, within a first preset direction range, a first radio frequency (RF) signal in a first frequency band;
a dielectric substrate spaced apart from the first antenna module and at least partially located within the first preset direction range, wherein a part of the dielectric substrate located within the first preset direction range has a first equivalent wave impedance to the first RF signal in the first frequency band, the first equivalent wave impedance differing from a wave impedance of free space by a first difference; and
a first radio-wave transparent structure carried on the dielectric substrate and at least partially located within the first preset direction range;
the electronic device has a second equivalent wave impedance to the first RF signal in the first frequency band in a region corresponding to the first radio-wave transparent structure, the second equivalent wave impedance differing from the wave impedance of the free space by a second difference, the second difference being less than the first difference; and
wherein the first radio-wave transparent structure on the dielectric substrate is capable of being excited by the first RF signal in the first frequency band, and the radio-wave transparent structure generates an RF signal in the same frequency band as the first frequency band according to the first RF signal in the first frequency band when the radio-wave transparent structure is excited by the RF signal in the preset frequency band, and the RF signal generated by the first radio-wave transparent structure and the first RF signal in the first frequency band pass through the dielectric substrate and radiate into free space;
wherein the radio-wave transparent structure comprises a plurality of mesh-grid structures arranged in an array each of the plurality of mesh-grid structures is defined by at least one conductive line, and two adjacent mesh-grid structures share at least part of the conductive line.

17. The electronic device of claim 16, further comprising:
a second antenna module spaced apart from the first antenna module and located outside the first preset direction range, wherein the second antenna module is configured to emit and receive, within a second preset direction range, a second RF signal in a second frequency band;
the dielectric substrate being also spaced apart from the second antenna module and at least partially located within the second preset direction range, wherein a part of the dielectric substrate located within the second preset direction range has a third equivalent wave impedance to the second RF signal in the second frequency band, and the third equivalent wave impedance differs from the wave impedance of the free space by a third difference; and
a second radio-wave transparent structure carried on the dielectric substrate and at least partially located within the second preset direction range;
the electronic device having a fourth equivalent wave impedance to the second RF signal in the second frequency band in a region corresponding to the second radio-wave transparent structure, the fourth equivalent wave impedance differing from the wave impedance of the free space by a fourth difference, wherein the fourth difference is less than the third difference.

18. The electronic device of claim 17, wherein the dielectric substrate comprises a battery cover of the electronic device, and the battery cover of the electronic device comprises a rear plate and a frame bent and extended from a periphery of the rear plate, wherein:
the first antenna module and the second antenna module are both disposed corresponding to the rear plate; or
the first antenna module and the second antenna module are both disposed corresponding to the frame; or
the first antenna module is disposed corresponding to the rear plate and the second antenna module is disposed corresponding to the frame.

19. The electronic device of claim 17, wherein the dielectric substrate comprises a screen of the electronic device, and the screen comprises a screen body and an extending portion bent and extended from a periphery of the screen body, wherein:
the first antenna module and the second antenna module are both disposed corresponding to the screen body; or
the first antenna module and the second antenna module are both disposed corresponding to the extending portion; or
the first antenna module is disposed corresponding to the screen body and the second antenna module is disposed corresponding to the extending portion.

* * * * *